(12) United States Patent
Wan et al.

(10) Patent No.: US 11,620,465 B2
(45) Date of Patent: *Apr. 4, 2023

(54) RFID MOTION DETECTION FOR DENSE RFID TAG ENVIRONMENTS

(71) Applicant: Intel Corporation, Santa Clara, CA (US)

(72) Inventors: Chieh-Yih Wan, Beaverton, OR (US); Rahul C. Shah, San Francisco, CA (US); Cagri C. Tanriover, Bethany, OR (US); Ke-Yu Chen, San Ramon, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/093,418

(22) Filed: Nov. 9, 2020

(65) Prior Publication Data

US 2021/0342560 A1 Nov. 4, 2021

Related U.S. Application Data

(63) Continuation of application No. 16/697,098, filed on Nov. 26, 2019, now Pat. No. 10,832,024.

(51) Int. Cl.
*G06K 7/10* (2006.01)
*G06N 20/00* (2019.01)
(Continued)

(52) U.S. Cl.
CPC ............ *G06K 7/10425* (2013.01); *G01S 5/02* (2013.01); *G06K 7/10297* (2013.01); *G06N 20/00* (2019.01); *G06Q 10/087* (2013.01)

(58) Field of Classification Search
CPC .......... G06K 7/10425; G06K 7/10297; G06Q 10/087; G06N 20/00
See application file for complete search history.

(56) References Cited

U.S. PATENT DOCUMENTS 9,489,655 B1 * 11/2016 Lecky ................. G06Q 10/087
9,805,233 B2 10/2017 Sample et al.
(Continued)

OTHER PUBLICATIONS

Shangguan, Longfei et al., "ShopMiner: Mining Customer Shopping Behavior in Physical Clothing Stores with COTS RFID Devices," SenSys' 15, Nov. 1-4, 2015, Seoul South Korea, 2015 Acm, ISBN 978-14503-3631-4/15/11 (14 pages).
(Continued)

*Primary Examiner* — Hongmin Fan
(74) *Attorney, Agent, or Firm* — Alliance IP, LLC

(57) ABSTRACT

In one embodiment, an apparatus comprises processing circuitry to: receive wireless signal data corresponding to an RFID tag, wherein the wireless signal data comprises signal strength data and signal phase data corresponding to wireless signals transmitted by the RFID tag and received by an RFID reader; generate decomposed signal strength data based on a seasonal decomposition of the signal strength data; generate a frequency-phase curve based on the signal phase data; extract a set of signal strength features based on the decomposed signal strength data; extract a set of signal phase features based on the frequency-phase curve; and detect a motion state of the RFID tag using a machine learning classifier, wherein the machine learning classifier is trained to detect the motion state based on the set of signal strength features and the set of signal phase features.

25 Claims, 15 Drawing Sheets

(51) Int. Cl.
*G06Q 10/087* (2023.01)
*G01S 5/02* (2010.01)

(56) References Cited

U.S. PATENT DOCUMENTS

| | | |
|---|---|---|
| 9,836,936 B1 | 12/2017 | Brown et al. |
| 9,939,816 B2 | 4/2018 | Andrés et al. |
| 9,941,573 B2 | 4/2018 | Fukuda |
| 10,037,449 B1 | 7/2018 | Hahn et al. |
| 10,586,082 B1 | 3/2020 | Tang et al. |
| 2005/0046584 A1 | 3/2005 | Breed |
| 2008/0180220 A1 | 7/2008 | Hollister et al. |
| 2018/0247092 A1* | 8/2018 | Khojastepour .......... G01S 11/06 |
| 2019/0346554 A1* | 11/2019 | Park ........................ G01S 13/82 |

OTHER PUBLICATIONS

Swedberg, Claire, "Pop-Up Experience Brings RFID Solution to Stores. The system, from the Lion'esque Group spinoff Field Test, tracks the movement of customer traffic and enables shoppers to create wish lists of products they see in a temporary environment," RFID Journal, Aug. 18, 2017 (2 pages).

* cited by examiner

RFID MOTION DETECTION FOR DENSE RFID TAG ENVIRONMENTS

CROSS-REFERENCE TO RELATED APPLICATIONS

This Application is a continuation (and claims the benefit of priority under 35 U.S.C. § 120) of U.S. application Ser. No. 16/697,098, filed Nov. 26, 2019 and entitled BEHAVIOR DETECTION USING RFID IN ENVIRONMENTS WITH HIGH RFID TAG DENSITY. The disclosure of the prior Application is considered part of and is incorporated by reference in the disclosure of this Application.

FIELD OF THE SPECIFICATION

This disclosure relates in general to the field of behavior detection systems, and more particularly, though not exclusively, to behavior detection using RFID in environments with a high density of RFID tags.

BACKGROUND

In the retail industry, RFID technology has been primarily used for basic inventory tracking. Existing solutions, however, are unable to accurately detect motion, behavior, and interactions associated with the retail products that have RFID tags attached to them, particularly in environments with a high density of RFID tags, as it is often difficult to achieve a high tag read rate in those environments.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
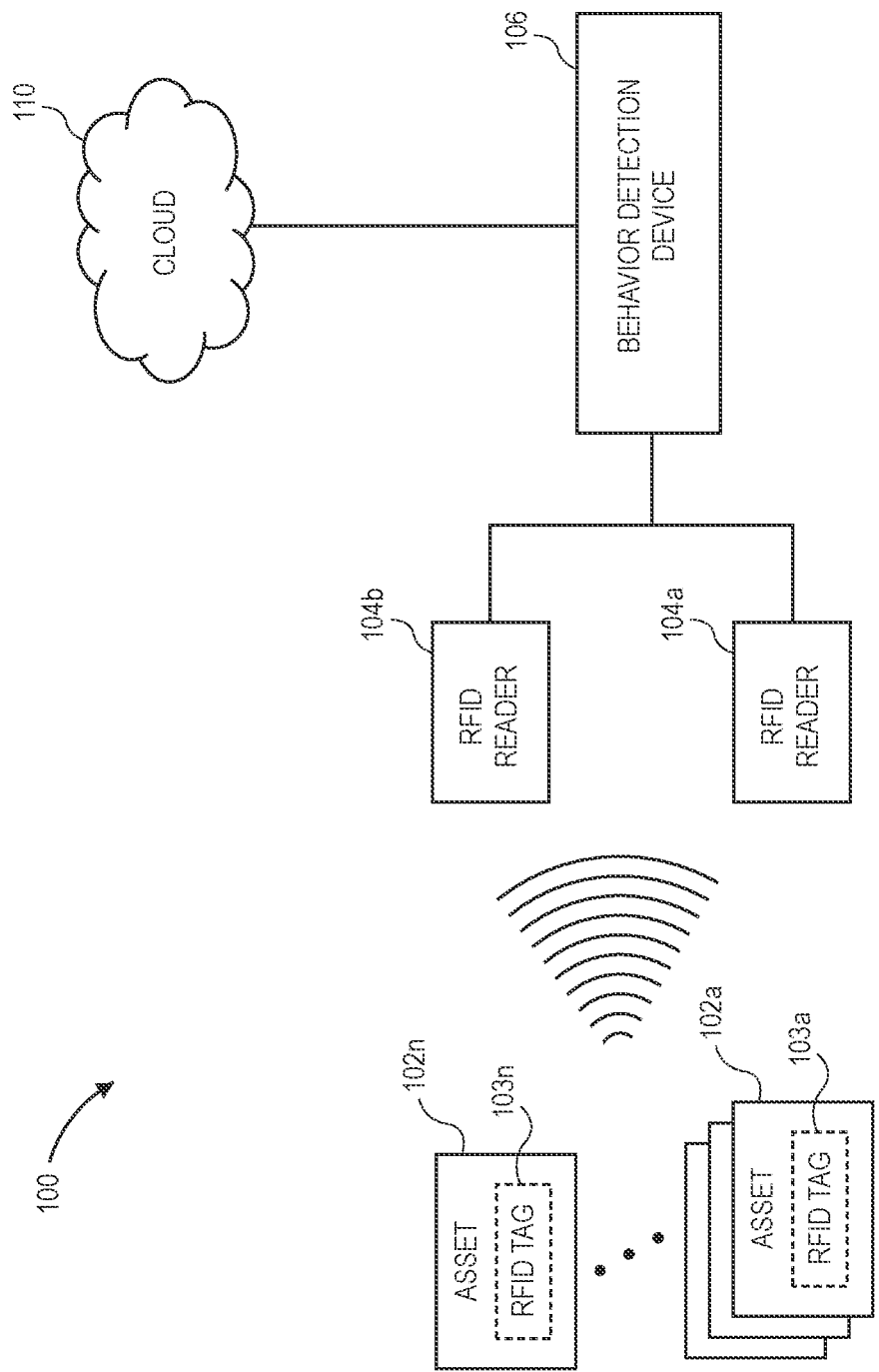
FIG. 1 illustrates an example embodiment of an RFID behavior detection system.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

RFID Motion and Behavior Detection

Unlike online retailers, a major problem facing brick and mortar retailers is the inability to capture meaningful data-unobtrusively-on how shoppers behave and roam around in a store before making a purchase. For example, retailers want to understand what items a shopper browses while in a store, how much time the shopper spends browsing each item, how the shopper physically manipulates each item, what items are browsed concurrently and/or successively, and any other shopper behavioral patterns in the store that eventually lead to a successful sale. Retailers can then leverage this intelligence regarding shopper behavior to increase sales, such as by optimizing the layout or arrangement of items in the store, providing a comfortable shopping experience, offering discounts on certain items (or combinations of items), and so forth.

Although many retail stores are equipped with cameras that could potentially be used to detect some degree of shopper behavior, vision-based artificial intelligence (AI) is unable to provide the requisite level of detail on shopper behavior that retailers need. As an example, many items in a store often appear visually similar to a camera (e.g., clothing items of a similar type, design, or color, particularly when folded), which makes it difficult for a camera to differentiate between those items. Vision-based approaches also suffer from occlusions when the line-of-sight of a camera is blocked or obstructed, such as when a shopper's back is towards the camera while browsing (thus obstructing items that are browsed from the camera view), or when the shopper becomes obstructed from the camera view by other people or objects in the store, among other examples. These problems are escalated further during peak business hours when many customers are walking around a store and simultaneously browsing many items. Moreover, beyond these physical constraints, developing and training vision-based AI algorithms capable of accurately capturing shopper behavior at the requisite granularity would require an extraordinary volume of video data to be collected and labeled using manual human labor, which is a prohibitively expensive undertaking for retailers.

Many retail stores are also equipped with RFID technology (e.g., RFID readers and RFID tags attached to retail items), which is primarily used for inventory tracking purposes. While current RFID-based solutions are also capable of inferring some degree of human-object interactions from the low-level backscattered signals from RFID tags, those solutions require the tag read rate to be high enough to reconstruct phase and identify trend in its spatial-temporal correlation. The high read rate requirement, however, limits those solutions to a tag density of less than 100 tags within the range of an RFID reader, which is highly unrealistic in a retail environment.

Thus, existing solutions that leverage computer vision and/or RFID technology in retail environments suffer from numerous shortcomings.

For example, while camera-based solutions are easy to interpret from a human perspective and can be used to detect object interactions, a camera requires proper lighting and line-of-sight (LOS) to the subjects that are being monitored; if an interaction is blocked by the human body or the surrounding infrastructure, the system loses track of the subjects. In addition, there are often "blind spots" in areas of a retail environment that are not visible to any cameras, which results in dead zones that cannot be monitored by the system. Further, camera-based solutions have difficulty in distinguishing between similar looking objects (e.g., different styles of jeans), which limits their ability to derive meaningful insights about different products. Computer vision solutions are also ineffective at recognizing certain types of customer behavior, such as customers consuming goods and placing empty cases back on shelves, customers grabbing multiple items quickly or simultaneously, customers shopping as a group and placing items in each other's carts, customers committing theft, and so forth.

In order to compensate for these weaknesses, computer vision solutions are often supplemented with other technologies, such as motion detectors and other sensors (e.g., to detect when customers pick up and put back items on shelves), which further increases the cost of these solutions.

Computer vision solutions also rely heavily on deep learning, which requires large volumes of training data to be manually labeled by humans. This costly and time-consuming approach forces retailers to settle for more affordable solutions with less sophisticated functionality, such as calculating footfall (e.g., the number of people that enter a store), identifying customers' faces, generating heat maps of the store layout to identify areas of high shopper activity, and so forth. Detecting and tracking customer-product interactions using computer vision, however, requires a much finer level of granularity and is a highly expensive approach.

Current RFID-based solutions also suffer from various shortcomings. For example, while the retail industry has embraced the use of RFID for inventory tracking purposes, commercial applications of RFID for detecting customer-product interactions are virtually non-existent. Thus, the impact of commercial RFID-based solutions on customer satisfaction is limited to ensuring that products of interest are generally available to shoppers, which leaves the lucrative opportunity of providing a personalized shopping experience unaddressed.

Figure 2A:
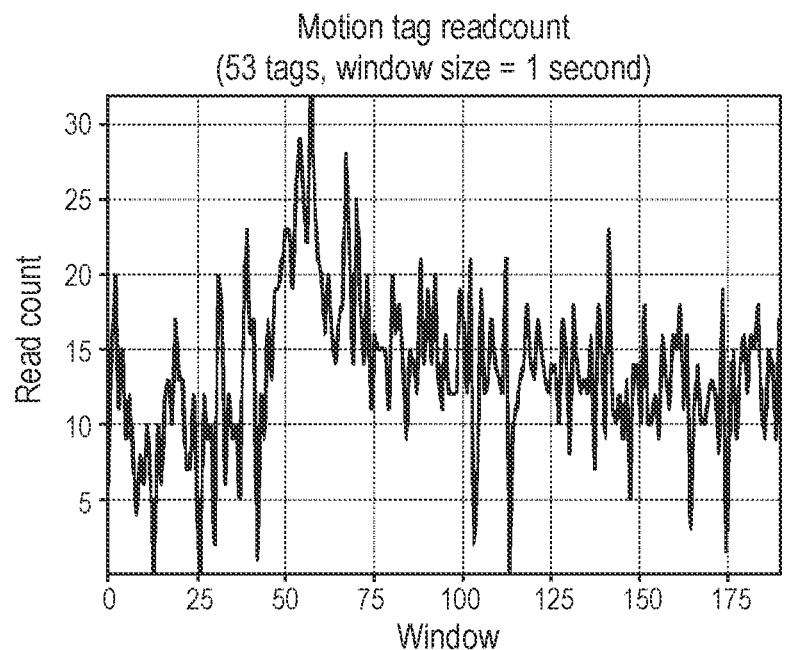
FIGS. 2A-C illustrate examples of the read rate of RFID tags in various environments.
Figure 2B:
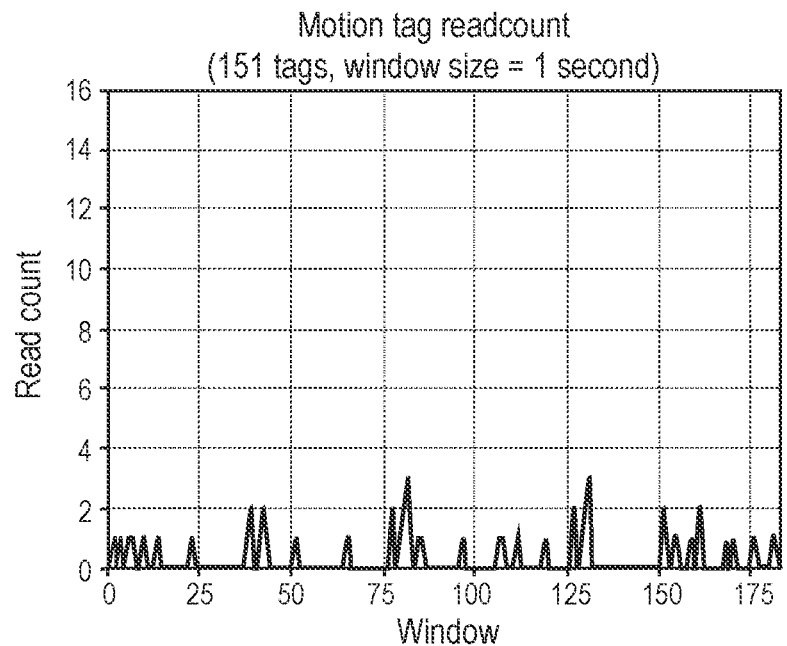
Figure 2C:
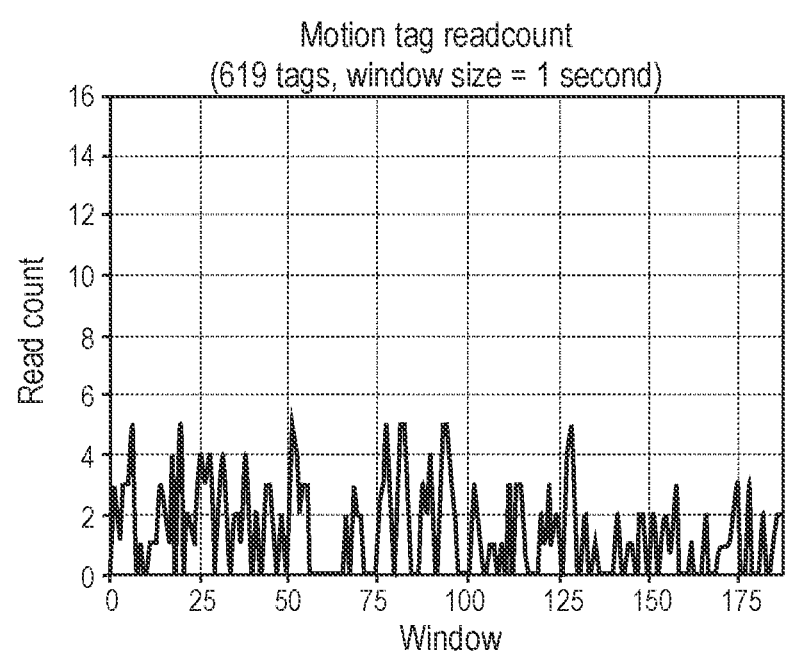

Moreover, solutions in academia that use RFID for detecting object interactions are unsuitable in environments with a high density of RFID tags. In particular, these solutions require a high read rate of individual RFID tags to identify phase data within a short timeframe (e.g., tens of milliseconds) in order to perform model training and inference. These solutions have only been tested in lab environments with a limited number of RFID tags (e.g., 30-50 tags or fewer), where a high per-tag read rate is easily attainable, as the read rate is calculated by dividing the aggregated tag read rate of the RFID reader (e.g., 1000 tag reads per second) by the total number of visible tags in the environment. In real deployment environments (e.g., retail stores), however, a single RFID reader is often required to monitor 1000 or more RFID tags in its radio frequency (RF) space, and thus the tag read rate can be extremely low, particularly due to collisions. For example, as shown in FIGS. 2A-C, the average read rate varies across environments with different tag densities, and the read rate in environments with higher tag density can even drop to zero at times, which causes frequent data gaps that can last over 10 seconds. Detecting RFID tag motion accurately in environments with high tag density (e.g., 100 tags, 500 tags, 1000 tags, or more) is an open problem that has not yet been solved.

Accordingly, this disclosure presents various embodiments of an RFID behavior detection system that can accurately detect motion of RFID tags even in environments with a high tag density, as described further below.

FIG. 1 illustrates an example embodiment of a radio frequency identification (RFID) behavior detection system 100. In the illustrated embodiment, RFID behavior detection system 100 includes a collection of physical assets 102a-n with corresponding RFID tags 103a-n, RFID readers 104a-b, a behavior detection device 106, and a cloud backend 110. Behavior detection system 100 detects behavior associated with the physical assets 102a-n based on motion associated with their corresponding RFID tags 103a-n. In some embodiments, for example, signal strength and signal phase features are extracted from radio signals that the RFID readers 104a-b receive from the RFID tags 103a-n, and those features are then analyzed using artificial intelligence and/or machine learning (e.g., by the behavior detection device 106) to detect motion associated with the RFID tags 103a-n, as described further below. Moreover, the detected motion of the RFID tags 103a-n can be further analyzed (e.g., by the behavior detection device 106 and/or the cloud 110) in order to derive or infer behavior associated with the corresponding physical assets 102a-n.

In some embodiments, for example, each RFID reader 104a,b periodically transmits an interrogation signal to the respective RFID tags 103a-n within its proximity, and upon receiving the interrogation signal, those RFID tags 103a-n transmit a responsive signal back to the RFID reader 104a,b, which typically includes a tag identifier (ID) and/or other data associated with the particular RFID tag. The RFID readers 104a,b measure the signal strength and phase of each responsive signal received from the RFID tags 103a-n, and those measurements are then provided to the behavior detection device 106, which uses them to detect motion associated with the RFID tags 103a-n.

In some embodiments, for example, motion associated with the RFID tags 103a-n is continuously detected over a moving time window (e.g., a three-second window) based on the signals received from each RFID tag during the current time window. For example, a collection of raw signal strength and phase measurements for the signals received from a particular RFID tag 103a-n during the current time window may be buffered or stored. The collection of raw signal measurements for that RFID tag may then be preprocessed, filtered, and/or sanitized. For example, because the sampling rate for each RFID tag 103a-n may vary across different time windows, the collection of raw signal measurements for a particular RFID tag during a given time window may be upsampled or downsampled to normalize the sampling rate of those measurements (e.g., via interpolation). Seasonal decomposition may then be performed on the resulting signal strength measurements to decompose them into a seasonal data series, a trend data series, and a residual data series. Moreover, spectral linearity tracking may be performed on the resulting signal phase measurements to generate a frequency-phase curve, which represents the signal phases detected across the various transmission frequencies used by the RFID tag.

Various feature sets may then be extracted based on the seasonal decomposition of signal strength measurements and the spectral linearity tracking of signal phase measurements. In particular, a signal strength feature set may be extracted based on the signal strength seasonal decomposition, and a signal phase feature set may be extracted based on the frequency-phase curve.

For example, the signal strength feature set may include (1) the trend extracted from the signal strength seasonal decomposition at specific frequencies, (2) the residual extracted from the signal strength seasonal decomposition at specific frequencies, and/or (3) the standard deviation of the signal strength measurements collected during the current time window.

Moreover, the signal phase feature set may include (1) the slope of the linear regression of the frequency-phase curve, (2) the correlation coefficient (or "R value") of the least-squares regression of the frequency-phase curve, (3) descending trends calculated based on phase variation, (4) the dynamic range of the signal phase values, and/or (5) the number of zero crossings in the frequency-phase curve.

A machine learning (ML) classifier is then used to detect, predict, or infer the motion state of the RFID tag 103a-n based on the signal strength and signal phase feature sets (e.g., using one or more trained machine learning models). In some embodiments, for example, the motion state detected by the ML classifier may indicate a time of occurrence, an RFID tag identifier (ID), whether the tag is stationary or moving, and/or an energy intensity of any tag movement.

The detected motion states of the various RFID tags 103a-n can then be further analyzed (e.g., by the behavior detection device 106 and/or the cloud 110) in order to derive or infer behavior associated with the corresponding physical assets 102a-n. For example, in the retail context (e.g., where the physical assets 102a-n are retail products), the motion states of the RFID tags 103a-n may be used to identify customer-product behavior and interactions and perform analytics based on the identified behavior and interactions.

This solution provides numerous advantages over existing solutions. For example, this solution provides highly accurate motion detection for RFID tags in environments with high tag density and low read rate (e.g., environments where 500 or more RFID tags co-exist in both stationary and moving states), along with accurate calculation of the energy intensity of the tag motion. Moreover, this solution does not require any a priori information on the location or identity of the RFID tags, nor any a priori information on which tags are likely to be in motion or are currently in motion. Further, unlike existing solutions, this solution does not require the signal phase to be reconstructed, which means its performance does not depend on achieving the high tag sampling rate that is required for phase reconstruction.

This solution also enables existing RFID readers to be extended with RFID tag motion and behavior detection capabilities without any additional hardware costs. For example, an RFID reader used for traditional inventory tracking can be extended with the described motion detection functionality to provide a more effective "responsive retail" solution.

Moreover, this solution enables sophisticated analytics to be derived regarding shopper behavior, including, but not limited to:

(1) identification of a shopper picking up single or multiple items on display;
(2) manual manipulation patterns of items in the store (e.g., patterns of tossing and turning items, and speed thereof, can indicate levels of interest in the items and even the likelihood of a potential sale);
(3) identification of associated or related items (e.g., a particular blouse simultaneously browsed with a particular skirt);
(4) amount of time spent browsing particular items (e.g., which can indicate the level of customer interest on those items and may be used to control the stock availability of certain items); and
(5) optimization of the store layout based on customer browsing patterns and the identified popular items (e.g., frequently associated clothing items can be placed near each other in the store to attract customer attention and increase the likelihood of a sale).

Further, this solution leverages RFID technology to provide a sensing and customer analytics solution that does not suffer from the "Non-Line-of-Sight" (NLOS), poor lighting, and calibration problems that all cameras installed in retail stores suffer from.

This solution also enables the possibility of incorporating multimodal use of RFID and computer vision solutions for behavior detection (e.g., using the available RFID readers and cameras installed throughout a store, or using RFID readers with integrated cameras).

This solution also easily scales across the different radio frequency (RF) environments that are typically found in different retail spaces (e.g., due to different layouts, furniture, and building structures). For example, FIGS. 2A-C illustrate the read rates of RFID tags across various environments. In particular, FIG. 2A corresponds to 53 tags in a clean RF environment, FIG. 2B corresponds to 151 tags in a harsh RF environment with heavy multipath, and FIG. 2C corresponds to 1000 tags in a clean environment with 619 tags visible to the RFID reader. As shown in these figures, the average read rate varies over time for different tag densities, but the read rate or sample rate of individual tags can still be significantly different in different environments regardless of the tag density, although the discrepancy is generally less severe in low tag density environments. This described solution, however, is designed to accurately detect motion and behavior of RFID tags even when subjected to the unreliable sampling issues that are commonly encountered across different environments with different tag densities, which often cause existing solutions to fail.

This solution can be used to detect motion and/or behavior in any desired context or use case, including, but not limited to, retail (e.g., inventory tracking, customer-product behavior detection), manufacturing (e.g., progress tracking of product manufacture), shipping and transportation (e.g., parcel tracking), asset tracking (e.g., personal property, humans, animals), and so forth.

Moreover, the motion and behavior detection functionality can be implemented using any type of processing device and/or combination of processing devices, such as processors integrated within RFID readers 104a-b, edge or on-premise processors and servers (e.g., behavior detection device 106), cloud servers 110, and so forth.

Further, RFID readers 104a-b may be implemented using any suitable combination of computing components for sending/receiving RF signals to/from RFID tags, and for the processing of those signals, such as an antenna, an integrated circuit or processor, memory, a power source, and so forth. Similarly, RFID tags 103a-n may be implemented using any suitable combination of computing components for sending/receiving RF signals to/from RFID readers, and for the processing of those signals, such as an antenna, an integrated circuit or processor, a memory to store data (e.g., a tag ID), a power source (e.g., a passive tag may include a means of collecting DC power from the signals sent by RFID readers, while an active tag may include a battery), and so forth.

Figure 3:
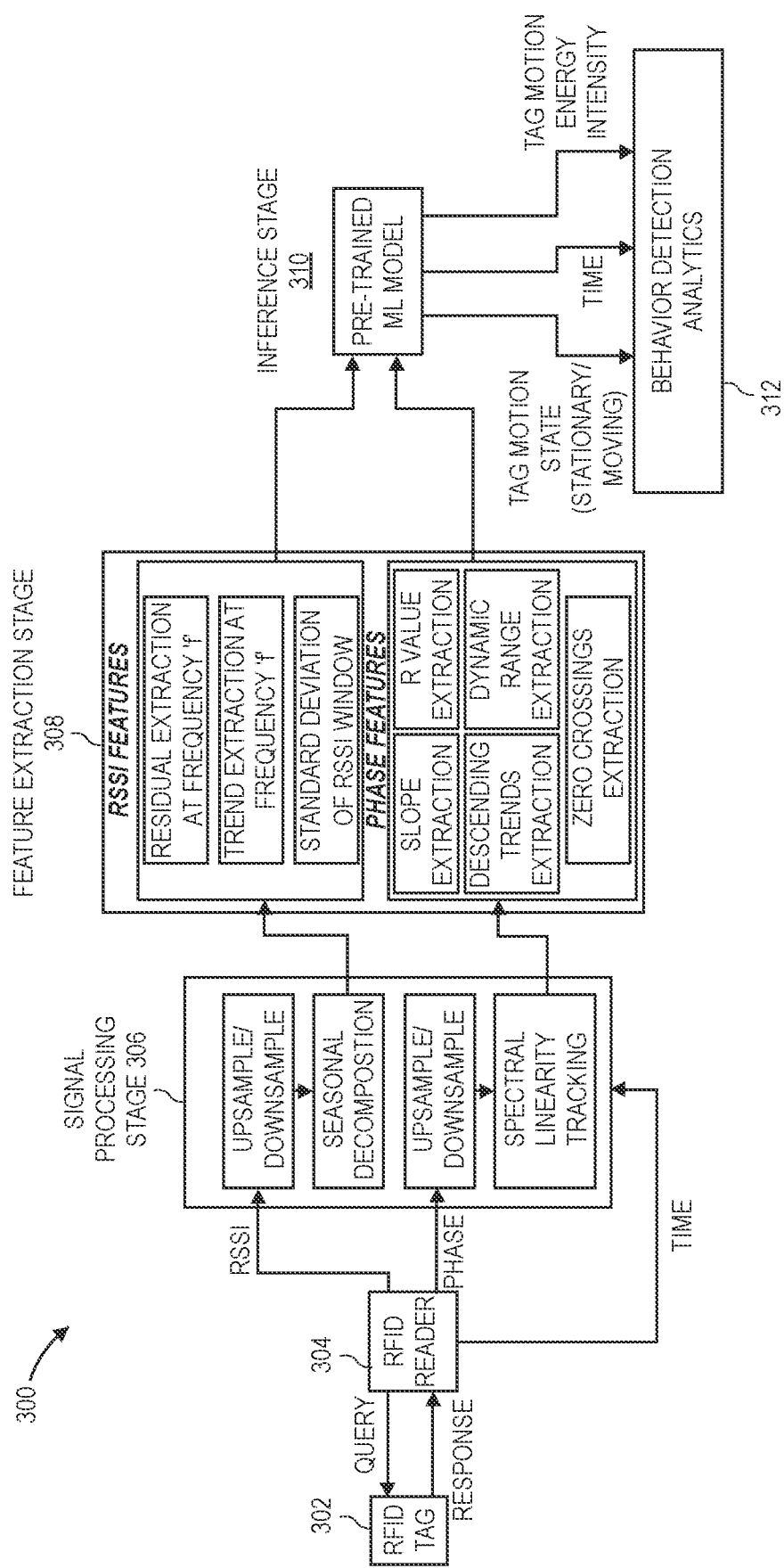
FIG. 3 illustrates an example processing pipeline for an RFID behavior detection system.

FIG. 3 illustrates an example processing pipeline 300 for an RFID behavior detection system. In some embodiments, for example, processing pipeline 300 may be implemented by RFID behavior detection system 100 of FIG. 1.

In processing pipeline 300, an RFID system performs RFID tag inventory on a periodic and/or continuous basis at certain time intervals. During the RFID tag inventory process, the RFID reader 304 sends out an interrogation signal or query to RFID tags 302 in the field that are within its radio frequency (RF) range, and the tags 302 that receive the query respond in a pseudorandom fashion to avoid or minimize collisions. This means that the RFID reader 304 cannot control when the tags 302 respond (e.g., due to the pseudorandom responses), which results in a variable sampling rate for each tag over a given time window. However, each time a tag 302 responds, the RFID reader 304 measures wireless parameters of the responsive signal, such as signal strength (e.g., a received signal strength indicator (RSSI)) and phase.

In processing pipeline 300, the wireless signal measurements collected for each tag are processed separately from, but in parallel with, those of other tags. In particular, as described further below, processing pipeline 300 includes three stages: signal processing (e.g., filtering and sanitization) 306, feature extraction 308, and machine learning (ML) inference 310.

In the signal processing stage 306, the wireless signal measurements collected for a particular tag during a given time window are filtered or sanitized. For example, when raw signal data (e.g., RSSI and phase measurements) for a particular tag is received from the RFID reader, the raw data is buffered over a particular time window, and the requisite signal processing is then applied to the collection of buffered data. In some embodiments, for example, the raw signal data is buffered over a moving time window of three seconds, and the resulting RSSI and phase datasets in the buffer are then processed separately.

In some cases, for example, the phase dataset is first unwrapped (e.g., 2Pi complement). Moreover, due to the variable or uneven sampling rate of an RFID system, the respective RSSI and phase datasets are then upsampled or downsampled (e.g., using interpolation) to a normalized or fixed sampling frequency (e.g., 16.67 Hz). The normalized RSSI and phase datasets are then separately processed in the manner described below.

In particular, seasonal decomposition is performed on the RSSI dataset to decompose the underlying data into seasonal, residual, and/or trend datasets. For example, with respect to RSSI or signal strength measurements, the signal energy varies with the distance between the tag and the RFID reader antenna, primarily due to RF-propagation-based fading. Moreover, when a tag is moved by a human, the RSSI signal tends to fluctuate significantly with the motion (especially for large or extreme motion) due to the shadowing effect from the human body in addition to the distance-based fading. To understand and interpret the meaning behind the level of fluctuation in the RSSI signal, seasonal decomposition is performed on the RSSI dataset. Conceptually, a seasonal decomposition algorithm decomposes the RSSI dataset into periodic (seasonal) and non-periodic (residual) signal portions or datasets. The idea behind the decomposition process is as follows: (i) when a tag is in motion, the non-periodic signal should fluctuate more significantly, as those motions are usually bursty and irregular; and (ii) when a tag remains stationary, the non-periodic signal should be relatively flat.

Figure 4A:
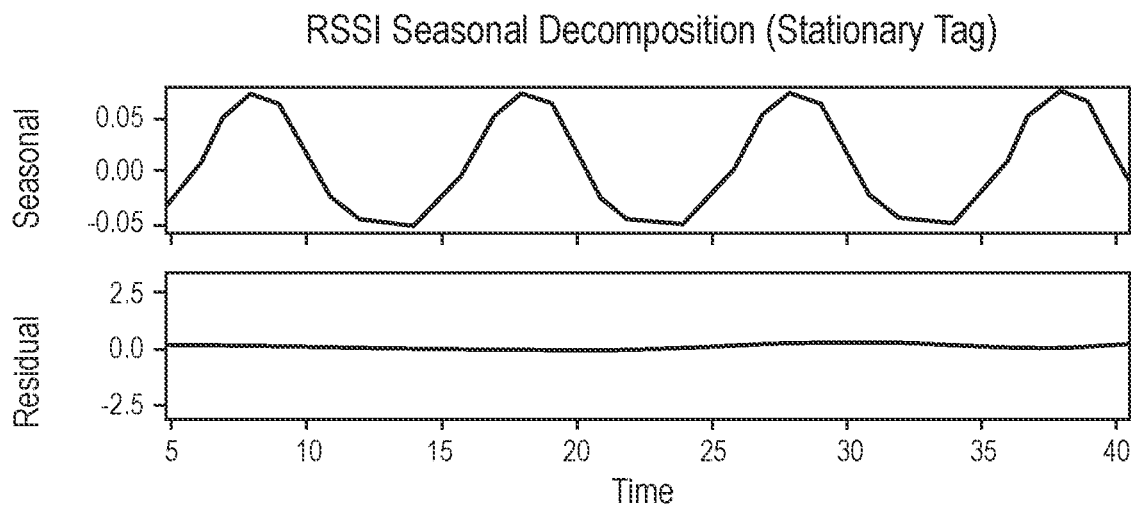
FIGS. 4A-B illustrate examples of signal strength (RSSI) seasonal decomposition for RFID tags in different motion states.
Figure 4B:
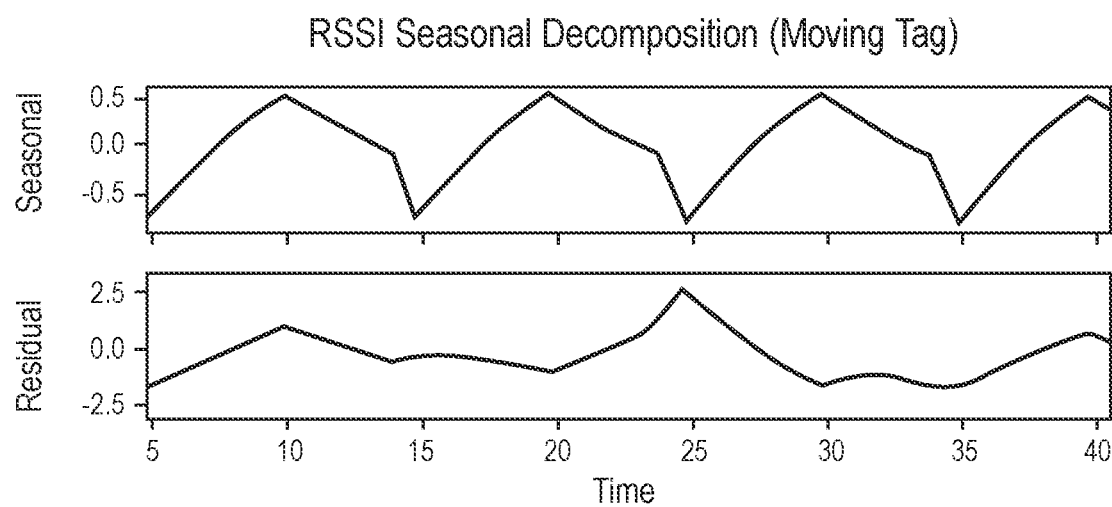

To illustrate, FIGS. 4A-B provide examples of the RSSI seasonal decompositions for RFID tags in different motion states. In particular, FIG. 4A illustrates the seasonal and residual datasets from the RSSI seasonal decomposition for a stationary tag, while FIG. 4B illustrates the seasonal and residual datasets from the RSSI seasonal decomposition for a moving tag. As shown by these examples, the motion tag (FIG. 4B, residual) has significantly more fluctuation in its non-periodic or residual signal compared to that of the stationary tag (FIG. 4A, residual).

Turning back to FIG. 3, with respect to the phase dataset, spectral linearity tracking is performed to examine the linearity of the underlying phase data across different frequencies within the hopping spectrum of the RFID reader. In particular, phase information is retrieved using the frequency-phase curve. For example, as RFID readers query the field, they hop frequencies periodically (e.g., every 200-400 milliseconds (ms)) to comply with applicable legal regulations, such as Federal Communications Commission (FCC) regulations. As a result, the phase dataset for an RFID tag includes phase readings for different frequencies over the sampling time window. Thus, the phase dataset can be represented using a frequency-phase curve, which represents the phase reading at each frequency used for signal transmission during the sampling time window. The information represented in the frequency-phase curve typically provides insight into the current motion state of the RFID tag.

Figure 5A:
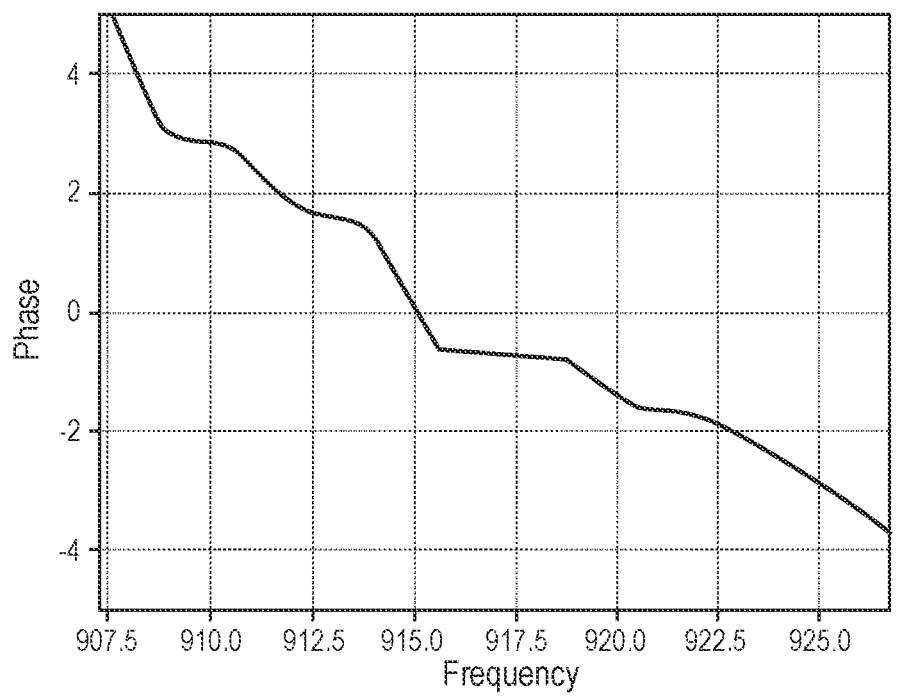
FIGS. 5A-B illustrate examples of frequency-phase curves for RFID tags in different motion states.
Figure 5B:
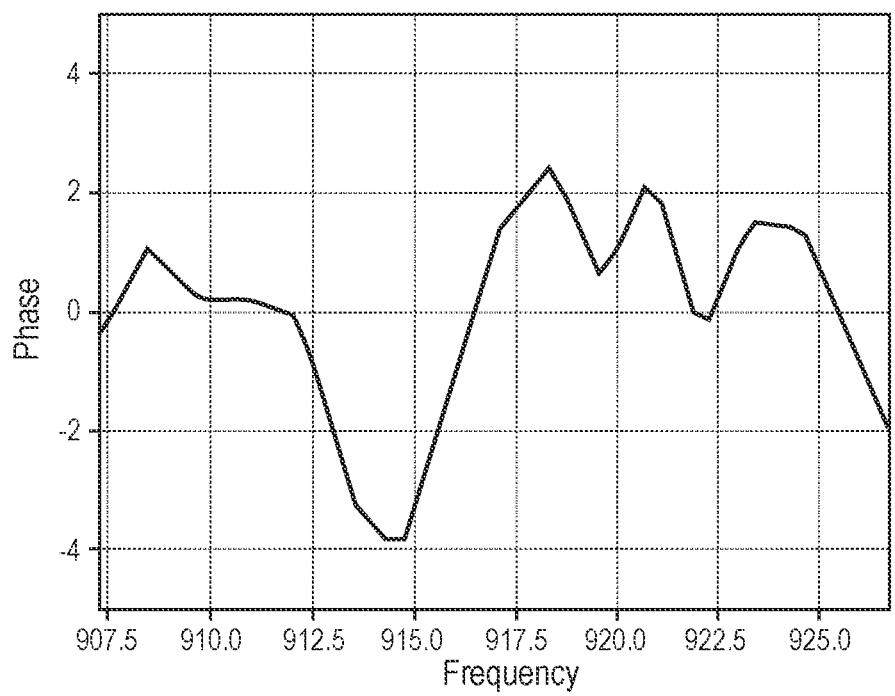

To illustrate, FIGS. 5A-B provide examples of the frequency-phase curves for RFID tags in different motion states, which are generated from the respective phase datasets collected for those tags over a 3-second sampling time window. In particular, FIG. 5A illustrates the frequency-phase curve for a stationary tag, while FIG. 5B illustrates the frequency-phase curve for a moving tag. The underlying phase data in the frequency-phase curve is extracted from the backscattered signal of the responding RFID tag and is sensitive to small distance changes between the tag and the antenna of the RFID reader. In the case of a stationary tag (e.g., the tag is not being moved by a human), there is no change in distance to the RFID reader antenna, which means phase should be a linear function of the carrier frequency, and thus the frequency-phase curve should be close to a straight line with a slope of −1 (as shown in FIG. 5A). In the case of a motion tag (e.g., the tag is being moved by a human), the linearity is destroyed and thus the frequency-phase curve tends to fluctuate (as shown in FIG. 5B).

Turning back to FIG. 3, once the signal processing stage 306 is complete, processing pipeline 300 enters the feature extraction stage 308. In the feature extraction stage 308, various signal strength and phase features are extracted from the RSSI seasonal decomposition and the frequency-phase curve that were generated during the signal processing stage 306.

For example, a signal strength feature set is extracted based on the RSSI seasonal decomposition. The signal strength feature set may include the following features:

(1) Trend: The trend refers to the underlying trend of the time series (e.g., based on the DC bias in a voltage signal). A trend data series is extracted from the RSSI seasonal decomposition at specific frequencies (e.g., 3, 6, and 9 Hz).

(2) Residual: The residual refers to the residuals of the original time series after the seasonal and trend data series are removed. A residual data series is extracted from the RSSI seasonal decomposition at specific frequencies (e.g., 3, 6, and 9 Hz).
(3) Standard Deviation: The standard deviation of the RSSI dataset is calculated over a moving average window of the original time series (e.g., the standard deviation of the RSSI or signal strength measurements collected during the current time window).

The specific frequencies at which the trend and residual are extracted may vary depending on the frequencies that are typically associated with the various tag motions of interest in a particular use case. As an example, when a human moves a tagged t-shirt, the frequencies of motion patterns are usually below 5 Hz. Thus, there are specific frequencies at which different browsing motions manifest themselves. In the above example, the trend and residual are extracted at 3, 6, and 9 Hz.

Moreover, a signal phase feature set is extracted based on the frequency-phase curve. The signal phase feature set may include the following features:
(1) Slope: The slope of the linear regression of the frequency-phase curve over a fixed time window (e.g., a three-second window).
(2) R Value: The "r value" or correlation coefficient of the least-squares regression of the frequency-phase curve over a fixed time window.
(3) Descending Trends: The descending trends capture whether the phase variation is trending up or down. In some cases, for example, the descending trends are calculated as the sum of the phase variation over a fixed time window. For example, by summing the deltas between two consecutive phase samples within a window, a positive sum implies an overall "up" trend within that window, while a negative sum implies an overall "down" trend within that window.
(4) Dynamic Range: The dynamic range of the signal phase values over a fixed time window.
(5) Zero Crossings: The number of zero crossings of the frequency-phase curve over a fixed time window.

These signal strength and signal phase feature sets typically provide insight into the current motion state of an RFID tag. To illustrate, FIGS. 6A-B provide examples of histograms that show the distribution of signal strength features and signal phase features for RFID tags in different motion states.

Figure 6A:
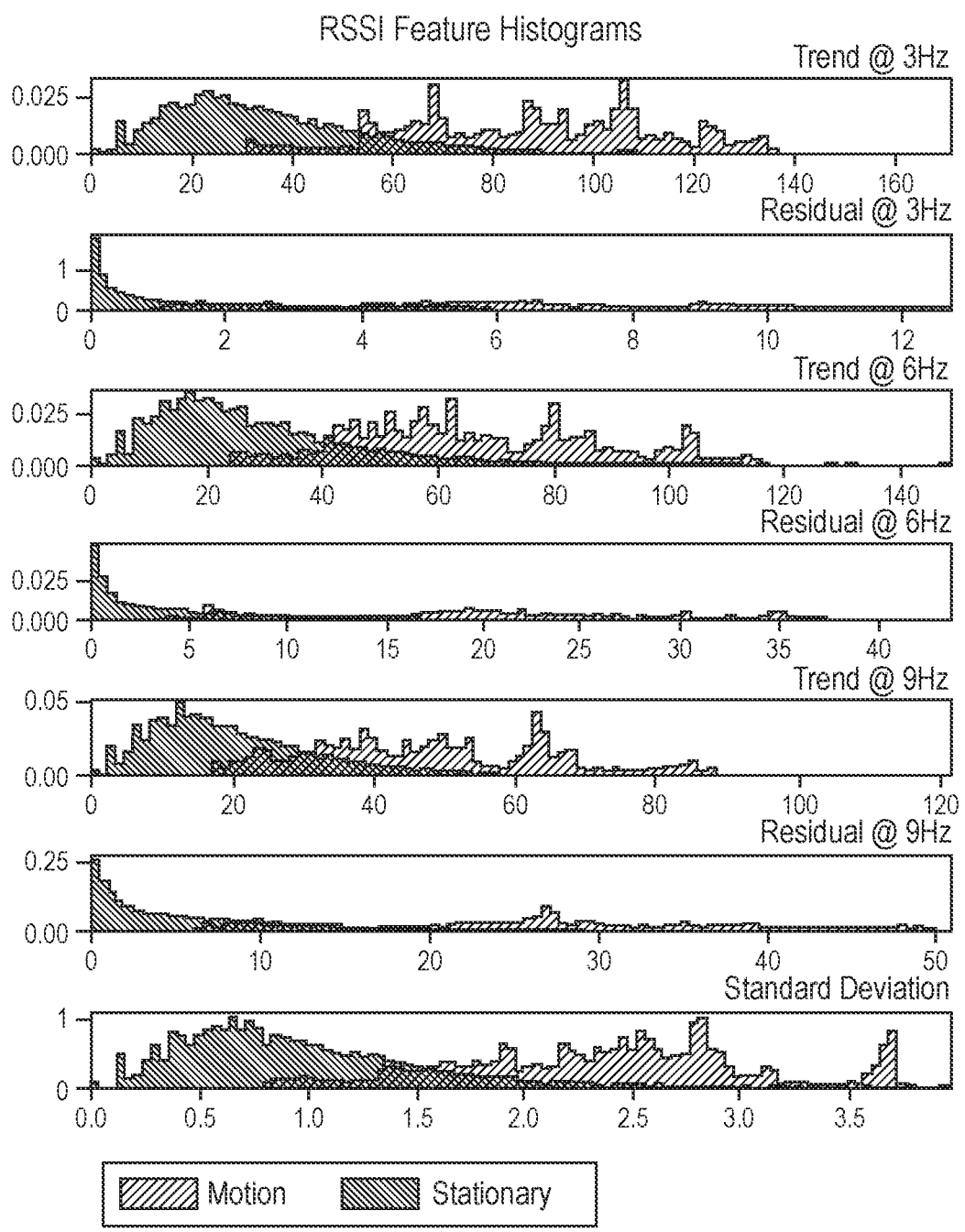
FIGS. 6A-B illustrate example histograms showing the distribution of signal strength and signal phase features for RFID tags in different motion states.

For example, the histograms in FIG. 6A show the distribution of signal strength features for a stationary tag and a motion tag. In particular, these histograms represent the trend and residual extracted at 3, 6, and 9 Hz from the seasonal decomposition of the RSSI sequence within the current time window, and the standard deviation of the RSSI window, for both the stationary tag and motion tag.

Figure 6B:
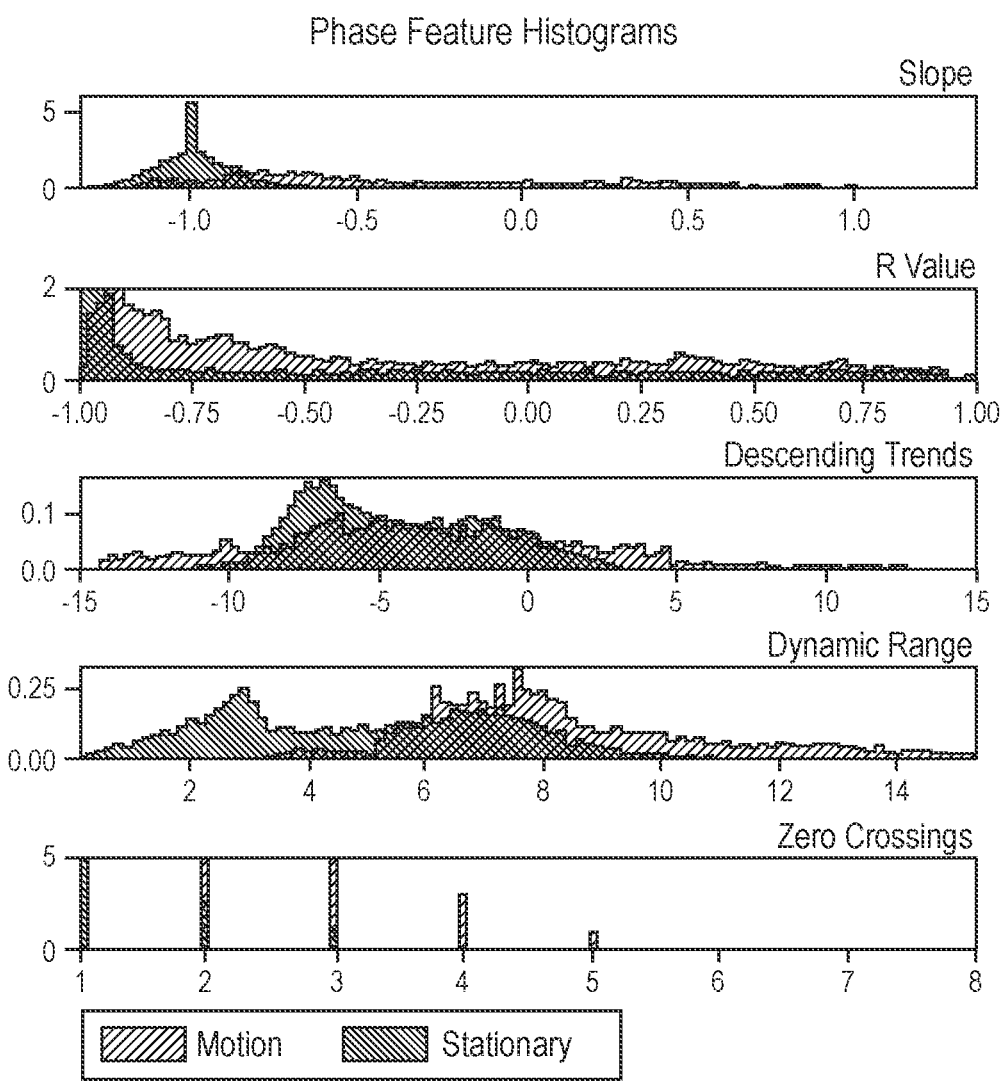

Similarly, the histograms in FIG. 6B show the distribution of signal phase features for the stationary tag and the motion tag. In particular, these histograms represent the slope, r value, descending trends, dynamic range, and number of zero crossings extracted from the frequency-phase curve for both the stationary tag and motion tag.

This combination of signal strength and phase metrics best characterizes the phase patterns of tags for the purpose of motion detection, with high tolerance for unreliable sampling issues over time, particularly in high tag density environments.

Turning back to FIG. 3, once the feature extraction stage 308 is complete, processing pipeline 300 enters the inference stage 310. In the inference stage 310, a machine learning (ML) classifier is used to detect, predict, or infer the motion state of the RFID tag based on the features extracted during the feature extraction stage 308.

For example, the ML classifier may include one or more pre-trained ML models that have been trained to infer the motion state of RFID tags based on the signal strength and phase features described above. In some embodiments, for example, the ML classifier may be implemented as a voting classifier that detects the motion state of the RFID tag based on motion state predictions from multiple machine learning models, such as a random forest model and a logistic regression model, among other examples. Alternatively, the machine learning classifier may be implemented as a single model classifier that detects or predicts the motion state of the RFID tag using a single machine learning model, such as a support-vector machine (SVM) model (e.g., linear kernel), a random forest model, or a logistic regression model, among other examples.

In this manner, the features extracted during the feature extraction stage 308 are supplied as input to the ML classifier, which uses the pre-trained ML model(s) to detect, predict, or infer the motion state of the RFID tag based on the extracted features. In some embodiments, the detected motion state may indicate a time of occurrence, an RFID tag identifier (tag ID), whether the tag is stationary or moving, an energy intensity of any tag movement, and/or any other type of information that relates to the motion state or behavior of the tag.

The detected motion state of the RFID tag can then be fed into a behavior detection analytics application 312, which analyzes the motion states of all RFID tags to derive or infer behavior associated with the physical assets corresponding to those tags. For example, in the retail context (e.g., where the physical assets are retail products), analytics may be performed on the motion states of RFID tags to identify customer behavior (e.g., customer-product interactions) and derive insights associated with that behavior.

Figure 7:
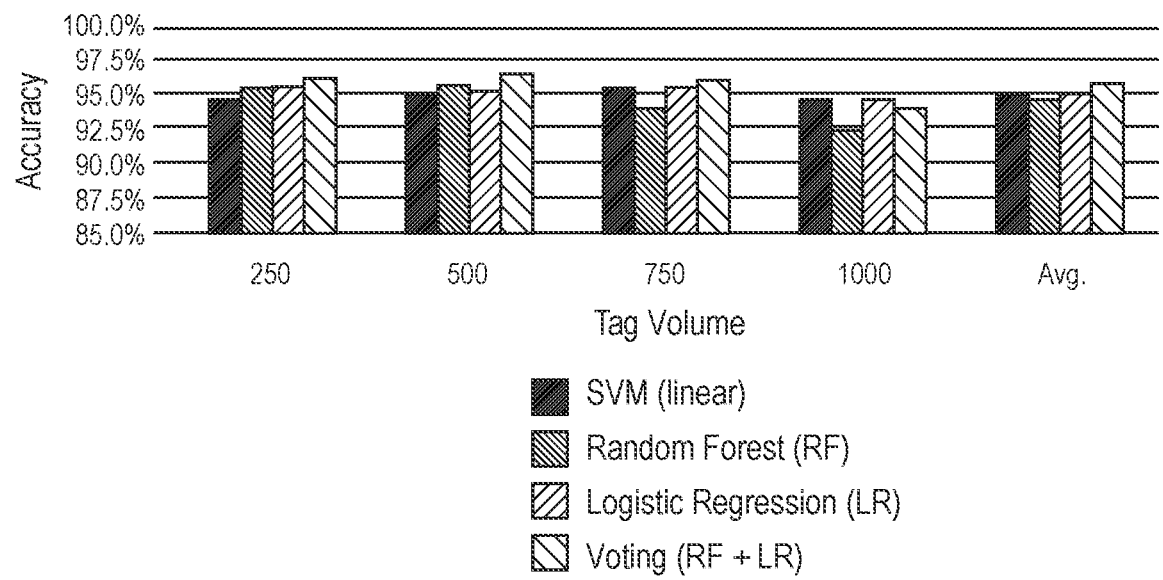
FIG. 7 illustrates a performance evaluation of a behavior detection system using various machine learning classifiers and RFID tag densities.

FIG. 7 illustrates a performance evaluation of the behavior detection system using various machine learning (ML) classifiers and RFID tag densities. In particular, FIG. 7 compares the motion detection accuracy of different ML classifiers for varying RFID tag densities using leave-one-testing-file out cross validation. The different tag densities range in volume from 250 tags, 500 tags, 750 tags, to 1000 tags. The different ML classifiers include a (i) support-vector machine (SVM) model (e.g., linear kernel), (ii) a random forest model, (iii) a logistic regression model, and (iv) a voting classifier that includes both random forest and logistic regression models. These classifiers have been trained to perform motion detection for RFID tags based on the signal strength and signal phase features sets described in connection with FIG. 3. As shown in FIG. 7, all of the classifiers achieve very high motion detection accuracy (~95%), but the voting classifier provides the best overall performance across the various tag densities. A confusion matrix depicting the motion detection accuracy of the voting classifier is shown in FIG. 8.

Figure 8:
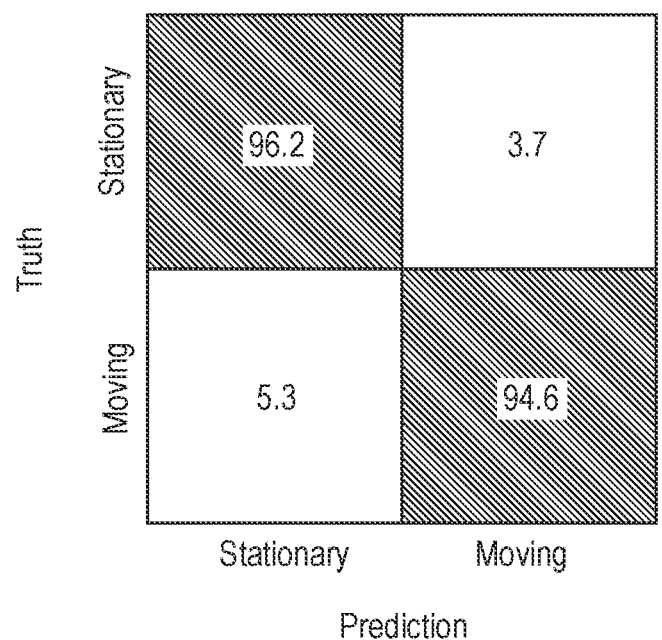
FIG. 8 illustrates a confusion matrix depicting the motion detection performance of a voting classifier.

As shown by FIGS. 7 and 8, this solution can detect whether tags are stationary or in motion with very high accuracy. Moreover, this solution is capable of monitoring 1000+ tags simultaneously, which is critical since there is typically no a priori knowledge of which tag a customer may possibly interact with.

In general, motion detection in environments with high tag densities can be challenging, as RFID readers can typically only achieve maximum read rates of 700-1000 reads per second, which is divided randomly among all tags (including certain tags possibly being read multiple times), thus achieving only a few readings per tag (at best) over a three second window.

Existing solutions attempt to accurately reconstruct the phase of each tag and then use the reconstructed phase to determine the tag state. This approach requires a high sampling rate for each tag, which may be possible when the tag field only contains roughly 25-50 tags, but not when there are hundreds or even thousands of tags.

On the other hand, the solution in this disclosure does not reconstruct the signal phase, but instead examines the linearity of the phase across frequencies (which can be done with only a few samples per tag), as well as separate out short-term fluctuations and long-term periodic changes in the RSSI data where the fluctuations provide lot more information about tag motion. Moreover, once the motion state of a tag (e.g., stationary or moving) has been determined over a three-second window, this inference can be combined with other inferences over longer timescales to achieve higher confidence in the motion inference. In this manner, this solution can detect consistent object interactions over tens of seconds, as well as quick short-term movements, such as a person picking up and placing down an object, a person holding an object in their hands and examining it, a person turning an object over once in a while, and so forth.

Moreover, this solution can be achieved without adding new hardware to existing RFID systems. For example, this solution can be implemented using existing RFID readers that have already been deployed along with the currently available commercial RFID tags—it does not require a higher density of RFID readers beyond what is already available in most retail stores. However, the stream of sensor data does need to be processed in order to understand the object interactions—the requisite processing power can be added to the RFID readers or the backend computing resources (e.g., on-premise, edge, and/or cloud processing resources or servers).

Figure 9:
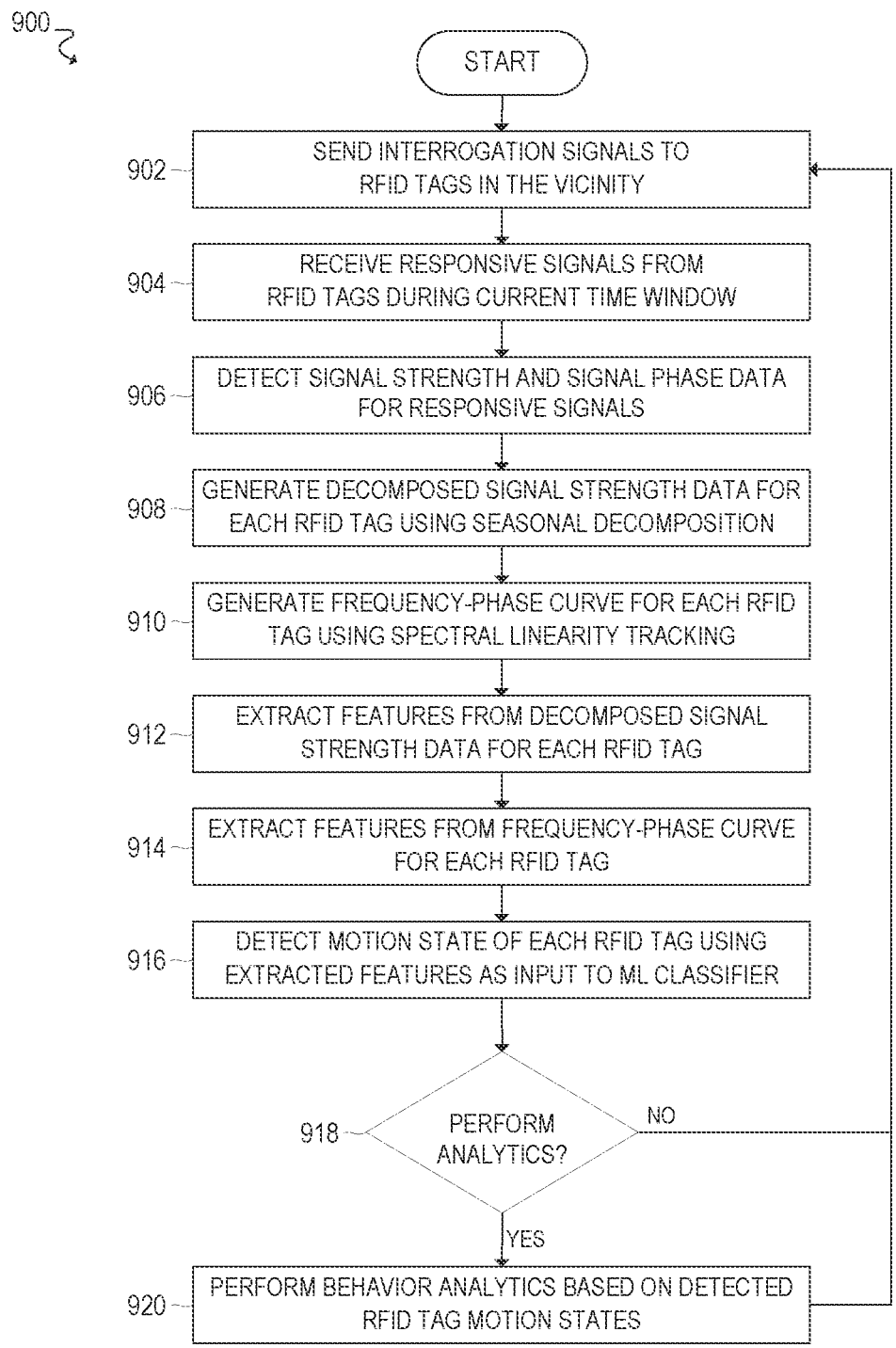
FIG. 9 illustrates a flowchart for an example embodiment of RFID behavior detection.

FIG. 9 illustrates a flowchart 900 for an example embodiment of RFID behavior detection. In various embodiments, flowchart 900 may be implemented using the embodiments and functionality described throughout this disclosure (e.g., RFID behavior detection system 100 of FIG. 1 and/or behavior detection processing pipeline 300 of FIG. 3).

The flowchart begins at block 902, where an RFID reader sends one or more interrogation signals to RFID tags in its vicinity during the current time window (e.g., a moving three-second window).

The flowchart then proceeds to block 904, where the RFID reader receives responsive wireless signals from one or more RFID tags during the current time window (e.g., in response to the interrogation signals sent by the RFID reader at block 902).

The flowchart then proceeds to block 906, where the RFID reader detects or measures wireless signal data associated with the responsive wireless signals received from the RFID tags. In some embodiments, for example, the wireless signal data may include signal strength data and/or signal phase data for the signals received from the RFID tags. For example, in some embodiments, the signal strength data may include received signal strength indicators (RSSIs) for the signals from the RFID tags.

The wireless signal data (e.g., signal strength and signal phase data) may then be sent to processing circuitry (e.g., via a communication interface) for further processing. In various embodiments, for example, the processing circuitry may be integrated within the RFID reader, and/or the processing circuitry may be implemented within another computing device, such as a processor, computer, and/or server at the edge and/or in the cloud (e.g., which may be connected to the RFID reader via a network). Thus, the processing circuitry may receive the wireless signal data (e.g., signal strength and signal phase data) from the RFID reader via a communication interface, such as a bus, interconnect, and/or network interface controller (NIC).

Moreover, in some embodiments, the processing circuitry may normalize the sampling rate of the wireless signal data for each RFID tag before any further processing is performed (e.g., by upsampling or downsampling the wireless signal data to a defined sampling rate using interpolation techniques).

The flowchart then proceeds to block 908, where seasonal decomposition is performed on the signal strength data for each RFID tag to generate corresponding decomposed signal strength data. In some embodiments, for example, the decomposed signal strength data for each RFID tag may include a seasonal data series, a trend data series, and/or a residual data series.

The flowchart then proceeds to block 910, where spectral linearity tracking is performed on the signal phase data for each RFID tag to generate a corresponding frequency-phase curve. In some embodiments, for example, the frequency-phase curve for each RFID tag indicates the signal phases that were detected across the various transmission frequencies used for the wireless signals from that tag.

The flowchart then proceeds to block 912, where a set of signal strength features is extracted from the decomposed signal strength data for each RFID tag. In some embodiments, for example, the set of signal strength features for each RFID tag may include trend data extracted from the trend data series of the decomposed signal strength data, residual data extracted from the residual data series of the decomposed signal strength data, and/or a standard deviation of the received signal strength indicators (RSSIs) extracted from the signal strength data. Moreover, in some embodiments, the trend data and the residual data may be extracted from the respective trend and residual data series at multiple different frequencies.

The flowchart then proceeds to block 914, where a set of signal phase features is extracted from the frequency-phase curve for each RFID tag. In some embodiments, for example, the set of signal phase features for each RFID tag may include a slope of a linear regression of the frequency-phase curve, a correlation coefficient of a least-squares regression of the frequency-phase curve, a descending trend corresponding to a phase variation of the signal phases, a dynamic range of the signal phases, and/or a number of zero crossings of the frequency-phase curve.

The flowchart then proceeds to block 916 to detect the motion state of each RFID tag by supplying its extracted features as input to a machine learning (ML) classifier. The ML classifier, for example, may be trained to detect motion states of RFID tags based on signal strength and signal phase features.

In some embodiments, for example, the machine learning classifier may be implemented as a voting classifier that detects the motion state of an RFID tag based on motion state predictions from multiple machine learning models, such as a random forest model and a logistic regression model, among other examples. Alternatively, the machine learning classifier may be implemented as a single model classifier that detects or predicts the motion state of the RFID tag using a single machine learning model, such as a support-vector machine (SVM) model, a random forest model, or a logistic regression model, among other examples.

In some embodiments, the detected motion state of an RFID tag may include a time of occurrence of the motion state, an identifier of the RFID tag, an indication of whether the RFID tag is stationary or moving, and/or a movement energy intensity of the RFID tag, among other examples.

The flowchart then proceeds to block 918 to determine whether to perform behavior detection analytics. In some embodiments, for example, analytics are periodically performed based on the motion states detected over time for the RFID tags in order to detect various types of behavior associated with the tags. In some embodiments, for example, the RFID tags may be associated with or attached to physical assets, and the motion states of the RFID tags may be used to detect behavior associated with those physical assets and derive analytics based on that behavior. In a retail environment, for example, the RFID tags may be attached to retail products, and the motion states of the RFID tags may be used to detect human interactions with the retail products, and derive analytics based on those interactions.

Thus, if it is determined at block 918 that behavior detection analytics should be performed, the flowchart proceeds to block 920 to perform behavior detection analytics based on the detected RFID tag motion states; otherwise, the flowchart proceeds back to block 902 to continue detecting RFID tag motion states for subsequent time windows.

At this point, the flowchart may be complete. In some embodiments, however, the flowchart may restart and/or certain blocks may be repeated. For example, in some embodiments, the flowchart may restart at block 902 to continue detecting motion and/or behavior associated with the RFID tags.

Example Computing Networks and Architectures

FIGS. 10-13 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 10:
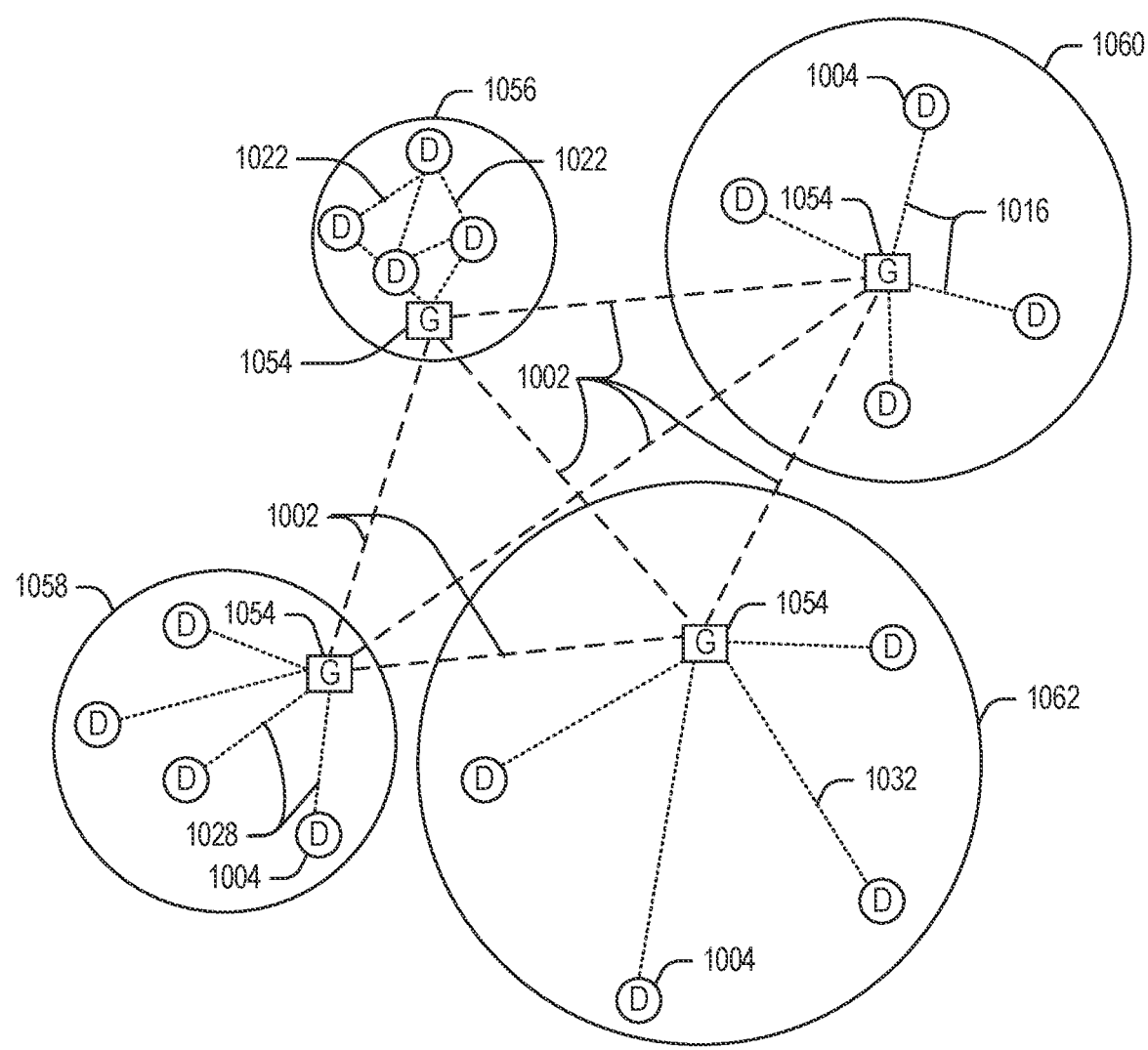
FIGS. 10, 11, 12, 13, and 14 illustrate examples of computing networks and architectures that can be used in accordance with embodiments described herein.

FIG. 10 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 10-13, present a number of new challenges in a heterogeneous network of connectivity comprising a combination of wired and wireless technologies.

FIG. 10 specifically provides a simplified drawing of a domain topology that may be used for a number of internet-of-things (IoT) networks comprising IoT devices 1004, with the IoT networks 1056, 1058, 1060, 1062, coupled through backbone links 1002 to respective gateways 1054. For example, a number of IoT devices 1004 may communicate with a gateway 1054, and with each other through the gateway 1054. To simplify the drawing, not every IoT device 1004, or communications link (e.g., link 1016, 1022, 1028, or 1032) is labeled. The backbone links 1002 may include any number of wired or wireless technologies, including optical networks, and may be part of a local area network (LAN), a wide area network (WAN), or the Internet. Additionally, such communication links facilitate optical signal paths among both IoT devices 1004 and gateways 1054, including the use of MUXing/deMUXing components that facilitate interconnection of the various devices.

The network topology may include any number of types of IoT networks, such as a mesh network provided with the network 1056 using Bluetooth low energy (BLE) links 1022. Other types of IoT networks that may be present include a wireless local area network (WLAN) network 1058 used to communicate with IoT devices 1004 through IEEE 802.11 (Wi-Fi®) links 1028, a cellular network 1060 used to communicate with IoT devices 1004 through an LTE/LTE-A (4G) or 5G cellular network, and a low-power wide area (LPWA) network 1062, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1004, such as over the backbone links 1002, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1056, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1058, for instance, may use systems that perform standards conversion to provide multi-standard connectivity, enabling IoT devices 1004 using different protocols to communicate. Further systems may provide seamless interconnectivity across a multi-standard infrastructure comprising visible Internet resources and hidden Internet resources.

Communications in the cellular network 1060, for instance, may be enhanced by systems that offload data, extend communications to more remote devices, or both. The LPWA network 1062 may include systems that perform non-Internet protocol (IP) to IP interconnections, addressing, and routing. Further, each of the IoT devices 1004 may include the appropriate transceiver for wide area communications with that device. Further, each IoT device 1004 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 11 below.

Figure 11:
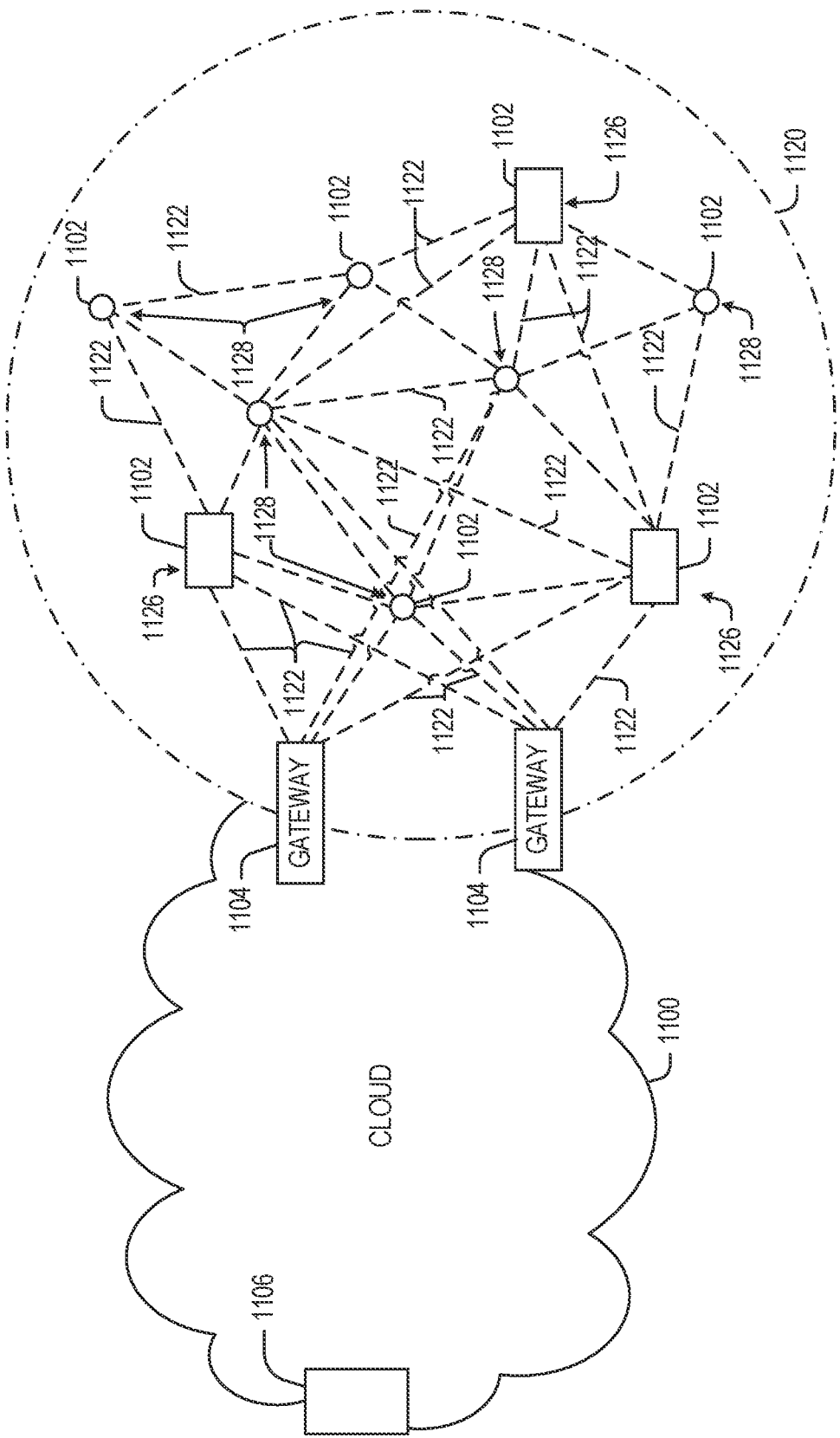

FIG. 11 illustrates a cloud computing network in communication with a mesh network of IoT devices (devices 1102) operating as a fog device at the edge of the cloud computing network. The mesh network of IoT devices may be termed a fog 1120, operating at the edge of the cloud 1100. To simplify the diagram, not every IoT device 1102 is labeled.

The fog 1120 may be considered to be a massively interconnected network wherein a number of IoT devices 1102 are in communications with each other, for example, by radio links 1122. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1102 are shown in this example, gateways 1104, data aggregators 1126, and sensors 1128, although any combinations of IoT devices 1102 and functionality may be used. The gateways 1104 may be edge devices that provide communications between the cloud 1100 and the fog 1120, and may also provide the backend process function for data obtained from sensors 1128, such as motion data, flow data, temperature data, and the like. The data aggregators 1126 may collect data from any number of the sensors 1128, and perform the back-end processing function for the analysis. The results, raw data, or both may be passed along to the cloud 1100 through the gateways 1104. The sensors 1128 may be full IoT devices 1102, for example, capable of both collecting data and processing the data. In some cases, the sensors 1128 may be more limited in functionality, for example, collecting the data and allowing the data aggregators 1126 or gateways 1104 to process the data.

Communications from any IoT device 1102 may be passed along a convenient path (e.g., a most convenient path) between any of the IoT devices 1102 to reach the gateways 1104. In these networks, the number of interconnections provide substantial redundancy, allowing communications to be maintained, even with the loss of a number of IoT devices 1102. Further, the use of a mesh network may allow IoT devices 1102 that are very low power or located at a distance from infrastructure to be used, as the range to connect to another IoT device 1102 may be much less than the range to connect to the gateways 1104.

The fog 1120 provided from these IoT devices 1102 may be presented to devices in the cloud 1100, such as a server 1106, as a single device located at the edge of the cloud 1100, e.g., a fog device. In this example, the alerts coming from the fog device may be sent without being identified as coming from a specific IoT device 1102 within the fog 1120. In this fashion, the fog 1120 may be considered a distributed platform that provides computing and storage resources to perform processing or data-intensive tasks such as data analytics, data aggregation, and machine-learning, among others.

In some examples, the IoT devices 1102 may be configured using an imperative programming style, e.g., with each IoT device 1102 having a specific function and communication partners. However, the IoT devices 1102 forming the fog device may be configured in a declarative programming style, allowing the IoT devices 1102 to reconfigure their operations and communications, such as to determine needed resources in response to conditions, queries, and device failures. As an example, a query from a user located at a server 1106 about the operations of a subset of equipment monitored by the IoT devices 1102 may result in the fog 1120 device selecting the IoT devices 1102, such as particular sensors 1128, needed to answer the query. The data from these sensors 1128 may then be aggregated and analyzed by any combination of the sensors 1128, data aggregators 1126, or gateways 1104, before being sent on by the fog 1120 device to the server 1106 to answer the query. In this example, IoT devices 1102 in the fog 1120 may select the sensors 1128 used based on the query, such as adding data from flow sensors or temperature sensors. Further, if some of the IoT devices 1102 are not operational, other IoT devices 1102 in the fog 1120 device may provide analogous data, if available.

Figure 12:
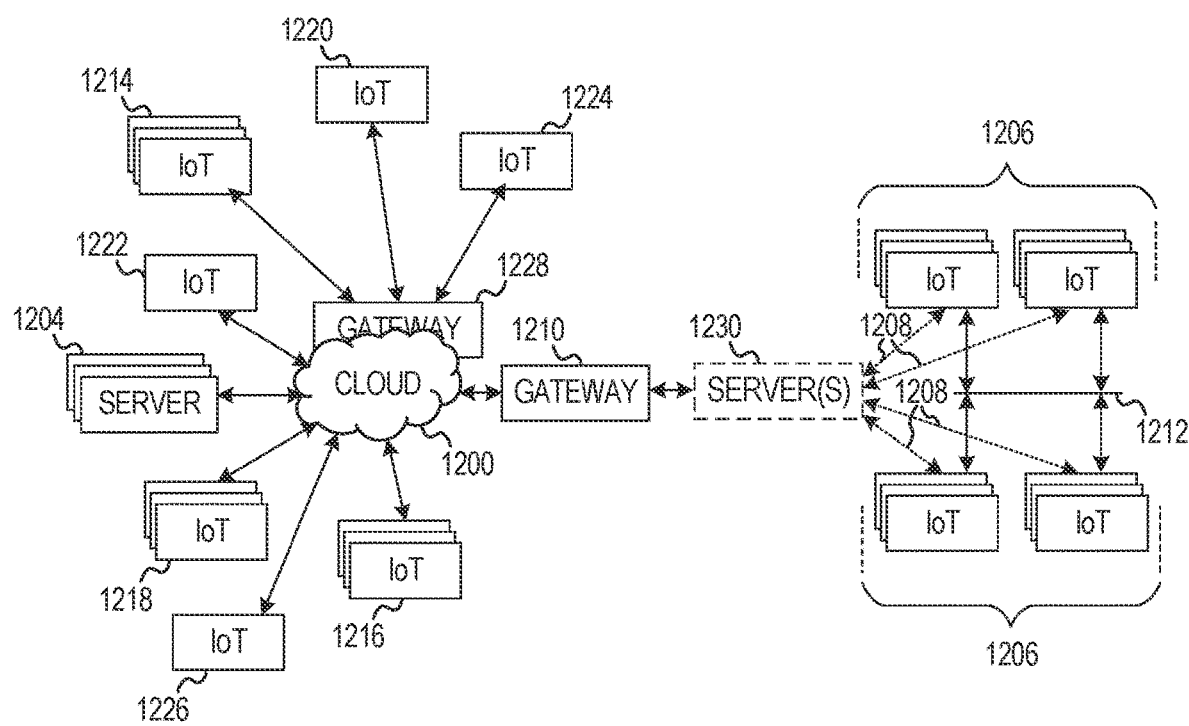

FIG. 12 illustrates a drawing of a cloud computing network, or cloud 1200, in communication with a number of Internet of Things (IoT) devices. The cloud 1200 may represent the Internet, or may be a local area network (LAN), or a wide area network (WAN), such as a proprietary network for a company. The IoT devices may include any number of different types of devices, grouped in various combinations. For example, a traffic control group 1206 may include IoT devices along streets in a city. These IoT devices may include stoplights, traffic flow monitors, cameras, weather sensors, and the like. The traffic control group 1206, or other subgroups, may be in communication with the cloud 1200 through wired or wireless links 1208, such as LPWA links, optical links, and the like. Further, a wired or wireless sub-network 1212 may allow the IoT devices to communicate with each other, such as through a local area network, a wireless local area network, and the like. The IoT devices may use another device, such as a gateway 1210 or 1228 to communicate with remote locations such as the cloud 1200; the IoT devices may also use one or more servers 1230 to facilitate communication with the cloud 1200 or with the gateway 1210. For example, the one or more servers 1230 may operate as an intermediate network node to support a local edge cloud or fog implementation among a local area network. Further, the gateway 1228 that is depicted may operate in a cloud-to-gateway-to-many edge devices configuration, such as with the various IoT devices 1214, 1220, 1224 being constrained or dynamic to an assignment and use of resources in the cloud 1200.

Other example groups of IoT devices may include remote weather stations 1214, local information terminals 1216, alarm systems 1218, automated teller machines 1220, alarm panels 1222, or moving vehicles, such as emergency vehicles 1224 or other vehicles 1226, among many others. Each of these IoT devices may be in communication with other IoT devices, with servers 1204, with another IoT fog device or system (not shown, but depicted in FIG. 11), or a combination therein. The groups of IoT devices may be deployed in various residential, commercial, and industrial settings (including in both private or public environments).

As can be seen from FIG. 12, a large number of IoT devices may be communicating through the cloud 1200. This may allow different IoT devices to request or provide information to other devices autonomously. For example, a group of IoT devices (e.g., the traffic control group 1206) may request a current weather forecast from a group of remote weather stations 1214, which may provide the forecast without human intervention. Further, an emergency vehicle 1224 may be alerted by an automated teller machine 1220 that a burglary is in progress. As the emergency vehicle 1224 proceeds towards the automated teller machine 1220, it may access the traffic control group 1206 to request clearance to the location, for example, by lights turning red to block cross traffic at an intersection in sufficient time for the emergency vehicle 1224 to have unimpeded access to the intersection.

Clusters of IoT devices, such as the remote weather stations 1214 or the traffic control group 1206, may be equipped to communicate with other IoT devices as well as with the cloud 1200. This may allow the IoT devices to form an ad-hoc network between the devices, allowing them to function as a single device, which may be termed a fog device or system (e.g., as described above with reference to FIG. 11).

Figure 13:
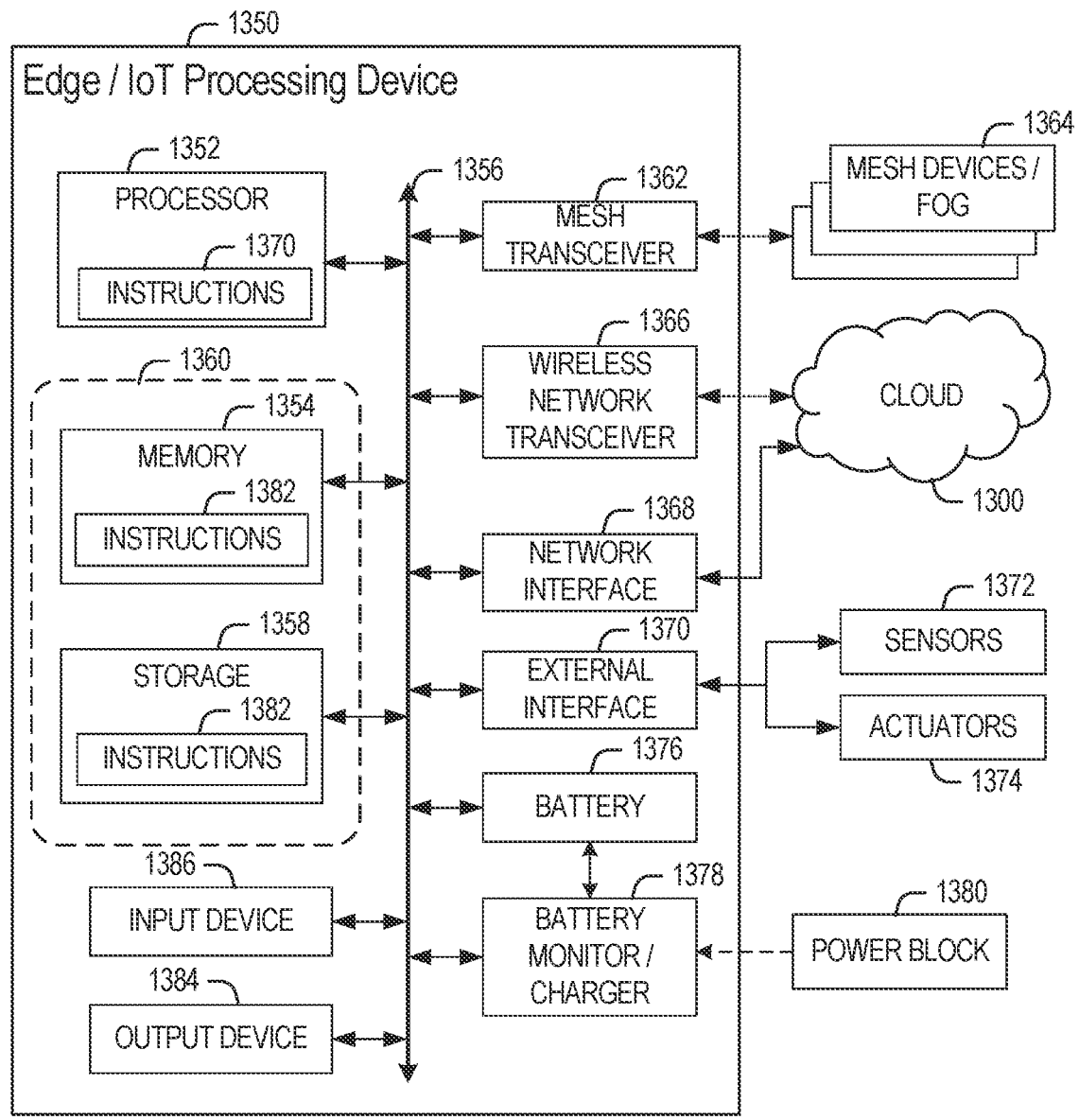

FIG. 13 is a block diagram of an example of components that may be present in an IoT device 1350 for implementing the techniques described herein. The IoT device 1350 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1350, or as components otherwise incorporated within a chassis of a larger system. Additionally, the block diagram of FIG. 13 is intended to depict a high-level view of components of the IoT device 1350. However, some of the components shown may be omitted, additional components may be present, and different arrangement of the components shown may occur in other implementations.

The IoT device 1350 may include a processor 1352, which may be a microprocessor, a multi-core processor, a multithreaded processor, an ultra-low voltage processor, an embedded processor, or other known processing element. The processor 1352 may be a part of a system on a chip (SoC) in which the processor 1352 and other components are formed into a single integrated circuit, or a single package, such as the Edison™ or Galileo™ SoC boards from Intel. As an example, the processor 1352 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1352 may communicate with a system memory 1354 over an interconnect 1356 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1358 may also couple to the processor 1352 via the interconnect 1356. In an example, the storage 1358 may be implemented via a solid state disk drive (SSDD). Other devices that may be used for the storage 1358 include flash memory cards, such as SD cards, microSD cards, xD picture cards, and the like, and USB flash drives. In low power implementations, the storage 1358 may be on-die memory or registers associated with the processor 1352. However, in some examples, the storage 1358 may be implemented using a micro hard disk drive (HDD). Further, any number of new technologies may be used for the storage 1358 in addition to, or instead of, the technologies described, such resistance change memories, phase change memories, holographic memories, or chemical memories, among others.

The components may communicate over the interconnect 1356. The interconnect 1356 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1356 may be a proprietary bus, for example, used in a SoC based system. Other bus systems may be included, such as an I2C interface, an SPI interface, point to point interfaces, and a power bus, among others.

The interconnect 1356 may couple the processor 1352 to a mesh transceiver 1362, for communications with other mesh devices 1364. The mesh transceiver 1362 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1364. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1362 may communicate using multiple standards or radios for communications at different range. For example, the IoT device 1350 may communicate with close devices, e.g., within about 10 meters, using a local transceiver based on BLE, or another low power radio, to save power. More distant mesh devices 1364, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1366 may be included to communicate with devices or services in the cloud 1300 via local or wide area network protocols. The wireless network transceiver 1366 may be a LPWA transceiver that follows the IEEE 802.15.4, or IEEE 802.15.4g standards, among others. The IoT device 1350 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as timeslotted channel hopping, described in the IEEE 802.15.4e specification may be used.

Any number of other radio communications and protocols may be used in addition to the systems mentioned for the mesh transceiver 1362 and wireless network transceiver 1366, as described herein. For example, the radio transceivers 1362 and 1366 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1362 and 1366 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1366, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1368 may be included to provide a wired communication to the cloud 1300 or to other devices, such as the mesh devices 1364. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1368 may be included to allow connect to a second network, for example, a NIC 1368 providing communications to the cloud over Ethernet, and a second NIC 1368 providing communications to other devices over another type of network.

The interconnect 1356 may couple the processor 1352 to an external interface 1370 that is used to connect external devices or subsystems. The external devices may include sensors 1372, such as accelerometers, level sensors, flow sensors, optical light sensors, camera sensors, temperature sensors, a global positioning system (GPS) sensors, pressure sensors, barometric pressure sensors, and the like. The external interface 1370 further may be used to connect the IoT device 1350 to actuators 1374, such as power switches, valve actuators, an audible sound generator, a visual warning device, and the like.

In some optional examples, various input/output (I/O) devices may be present within, or connected to, the IoT device 1350. For example, a display or other output device 1384 may be included to show information, such as sensor readings or actuator position. An input device 1386, such as a touch screen or keypad may be included to accept input. An output device 1384 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1350.

A battery 1376 may power the IoT device 1350, although in examples in which the IoT device 1350 is mounted in a fixed location, it may have a power supply coupled to an electrical grid. The battery 1376 may be a lithium ion battery, or a metal-air battery, such as a zinc-air battery, an aluminum-air battery, a lithium-air battery, and the like.

A battery monitor/charger 1378 may be included in the IoT device 1350 to track the state of charge (SoCh) of the battery 1376. The battery monitor/charger 1378 may be used to monitor other parameters of the battery 1376 to provide failure predictions, such as the state of health (SoH) and the state of function (SoF) of the battery 1376. The battery monitor/charger 1378 may include a battery monitoring integrated circuit, such as an LTC4020 or an LTC2790 from Linear Technologies, an ADT7488A from ON Semiconductor of Phoenix Ariz., or an IC from the UCD90xxx family from Texas Instruments of Dallas, Tex. The battery monitor/charger 1378 may communicate the information on the battery 1376 to the processor 1352 over the interconnect 1356. The battery monitor/charger 1378 may also include an analog-to-digital (ADC) convertor that allows the processor 1352 to directly monitor the voltage of the battery 1376 or the current flow from the battery 1376. The battery parameters may be used to determine actions that the IoT device 1350 may perform, such as transmission frequency, mesh network operation, sensing frequency, and the like.

A power block 1380, or other power supply coupled to a grid, may be coupled with the battery monitor/charger 1378 to charge the battery 1376. In some examples, the power block 1380 may be replaced with a wireless power receiver to obtain the power wirelessly, for example, through a loop antenna in the IoT device 1350. A wireless battery charging circuit, such as an LTC4020 chip from Linear Technologies of Milpitas, Calif., among others, may be included in the battery monitor/charger 1378. The specific charging circuits chosen depend on the size of the battery 1376, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1358 may include instructions 1382 in the form of software, firmware, or hardware commands to implement the techniques described herein. Although such instructions 1382 are shown as code blocks included in the memory 1354 and the storage 1358, it may be understood that any of the code blocks may be replaced with hardwired circuits, for example, built into an application specific integrated circuit (ASIC).

In an example, the instructions 1382 provided via the memory 1354, the storage 1358, or the processor 1352 may be embodied as a non-transitory, machine readable medium 1360 including code to direct the processor 1352 to perform electronic operations in the IoT device 1350. The processor 1352 may access the non-transitory, machine readable medium 1360 over the interconnect 1356. For instance, the non-transitory, machine readable medium 1360 may include storage units such as optical disks, flash drives, or any number of other hardware devices. The non-transitory, machine readable medium 1360 may include instructions to direct the processor 1352 to perform a specific sequence or flow of actions, for example, as described with respect to the flowchart(s) and diagram(s) of operations and functionality described throughout this disclosure.

Figure 14:
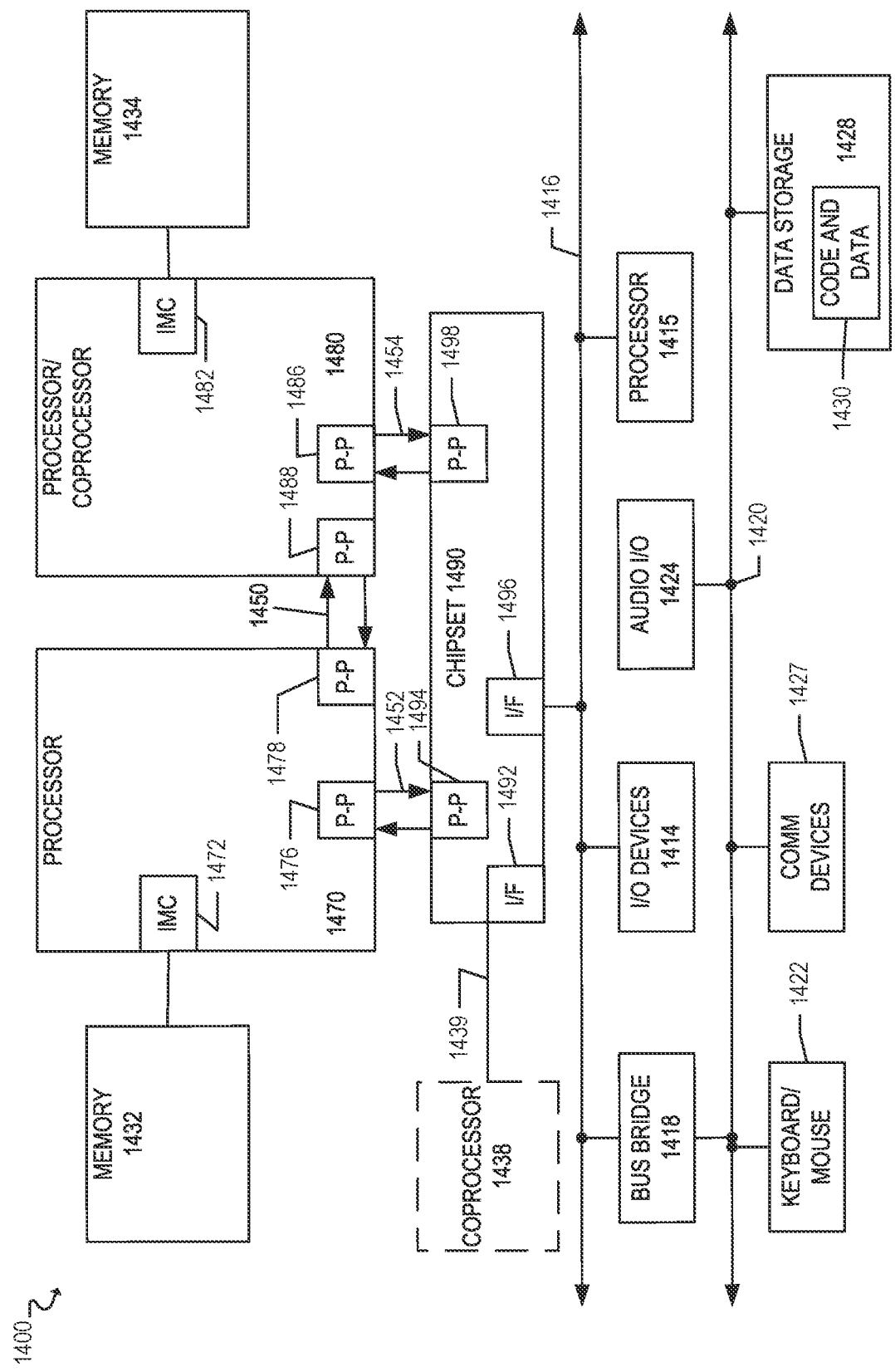

FIG. 14 illustrates a block diagram for an example embodiment of a multiprocessor 1400. In some embodiments, the processing architecture of FIG. 14 may be used to implement the functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

As shown in FIG. 14, multiprocessor system 1400 is a point-to-point interconnect system, and includes a first processor 1470 and a second processor 1480 coupled via a point-to-point interconnect 1450.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of this disclosure is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

All or part of any component of FIG. 14 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The machine-readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine-readable instructions may be fragmented and stored on one or more storage devices and/or computing devices (e.g., servers). The machine-readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine-readable instructions may be stored in multiple parts, which are individually compressed, encrypted, and stored on separate computing devices, wherein the parts when decrypted, decompressed, and combined form a set of executable instructions that implement a program such as that described herein. In another example, the machine-readable instructions may be stored in a state in which they may be read by a computer, but require addition of a library (e.g., a dynamic link library), a software development kit (SDK), an application programming interface (API), etc. in order to execute the instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, the disclosed machine-readable instructions and/or corresponding program(s) are intended to encompass such machine-readable instructions and/or program(s) regardless of the particular format or state of the machine readable instructions and/or program(s) when stored or otherwise at rest or in transit.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as standalone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a communication interface; and processing circuitry to: receive, via the communication interface, wireless signal data corresponding to a radio frequency identification (RFID) tag, wherein the wireless signal data comprises signal strength data and signal phase data, wherein the signal strength data and the signal phase data correspond to a plurality of wireless signals transmitted by the RFID tag and received by a radio frequency identification (RFID) reader; generate decomposed signal strength data based on a seasonal decomposition of the signal strength data, wherein the decomposed signal strength data comprises a seasonal data series, a trend data series, and a residual data series; generate a frequency-phase curve based on the signal phase data, wherein the frequency-phase curve indicates a plurality of signal phases detected across a plurality of transmission frequencies of the plurality of wireless signals; extract a set of signal strength features based on the decomposed signal strength data; extract a set of signal phase features based on the frequency-phase curve; and detect a motion state of the RFID tag using a machine learning classifier, wherein the machine learning classifier is trained to detect the motion state of the RFID tag based at least on the set of signal strength features and the set of signal phase features.

In one example embodiment of an apparatus: the RFID tag is associated with a physical asset; and the processing circuitry is further to detect behavior associated with the physical asset based on the motion state of the RFID tag.

In one example embodiment of an apparatus: the physical asset comprises a retail product; and the behavior associated with the physical asset comprises a human interaction with the retail product.

In one example embodiment of an apparatus, the motion state of the RFID tag comprises: a time of occurrence of the motion state; an identifier of the RFID tag; an indication of whether the RFID tag is stationary or moving; and a movement energy intensity of the RFID tag.

In one example embodiment of an apparatus, the set of signal strength features comprises: trend data extracted from the trend data series of the decomposed signal strength data; residual data extracted from the residual data series of the decomposed signal strength data; and a standard deviation of received signal strength indicators (RSSIs) extracted from the signal strength data.

In one example embodiment of an apparatus, the set of signal phase features comprises: a slope of a linear regression of the frequency-phase curve; a correlation coefficient of a least-squares regression of the frequency-phase curve; a descending trend corresponding to a phase variation of the plurality of signal phases; a dynamic range of the plurality of signal phases; and a number of zero crossings of the frequency-phase curve.

In one example embodiment of an apparatus, the machine learning classifier comprises a voting classifier, wherein the voting classifier is to detect the motion state of the RFID tag based on motion state predictions from a plurality of machine learning models.

In one example embodiment of an apparatus, the plurality of machine learning models comprises a random forest model and a logistic regression model.

In one example embodiment of an apparatus, the machine learning classifier comprises a single model classifier, wherein the single model classifier comprises: a support-vector machine (SVM) model; a random forest model; or a logistic regression model.

In one example embodiment of an apparatus, the processing circuitry is further to: normalize a sampling rate of the wireless signal data, wherein the sampling rate is to be normalized based on upsampling or downsampling the wireless signal data.

In one example embodiment of an apparatus, the processing circuitry to generate the frequency-phase curve based on the signal phase data is to: perform spectral linearity tracking on the signal phase data to generate the frequency-phase curve.

One or more embodiments may include at least one non-transitory machine accessible storage medium having instructions stored thereon, wherein the instructions, when executed on a machine, cause the machine to: receive, via a communication interface, wireless signal data corresponding to a radio frequency identification (RFID) tag, wherein the wireless signal data comprises signal strength data and signal phase data, wherein the signal strength data and the signal phase data correspond to a plurality of wireless signals transmitted by the RFID tag and received by a radio frequency identification (RFID) reader; generate decomposed signal strength data based on a seasonal decomposition of the signal strength data, wherein the decomposed signal strength data comprises a seasonal data series, a trend data series, and a residual data series; generate a frequency-phase curve based on the signal phase data, wherein the frequency-phase curve indicates a plurality of signal phases detected across a plurality of transmission frequencies of the plurality of wireless signals; extract a set of signal strength features based on the decomposed signal strength data; extract a set of signal phase features based on the frequency-phase curve; and detect a motion state of the RFID tag using a machine learning classifier, wherein the machine learning classifier is trained to detect the motion state of the RFID tag based at least on the set of signal strength features and the set of signal phase features.

In one example embodiment of a storage medium: the RFID tag is associated with a physical asset; and the instructions further cause the machine to detect behavior associated with the physical asset based on the motion state of the RFID tag.

In one example embodiment of a storage medium: the physical asset comprises a retail product; and the behavior associated with the physical asset comprises a human interaction with the retail product.

In one example embodiment of a storage medium, the motion state of the RFID tag comprises: a time of occurrence of the motion state; an identifier of the RFID tag; an indication of whether the RFID tag is stationary or moving; and a movement energy intensity of the RFID tag.

In one example embodiment of a storage medium, the set of signal strength features comprises: trend data extracted from the trend data series of the decomposed signal strength data; residual data extracted from the residual data series of the decomposed signal strength data; and a standard deviation of received signal strength indicators (RSSIs) extracted from the signal strength data.

In one example embodiment of a storage medium, the set of signal phase features comprises: a slope of a linear regression of the frequency-phase curve; a correlation coefficient of a least-squares regression of the frequency-phase curve; a descending trend corresponding to a phase variation of the plurality of signal phases; a dynamic range of the plurality of signal phases; and a number of zero crossings of the frequency-phase curve.

In one example embodiment of a storage medium, the machine learning classifier comprises a voting classifier, wherein the voting classifier is to detect the motion state of the RFID tag based on motion state predictions from a plurality of machine learning models.

In one example embodiment of a storage medium, the plurality of machine learning models comprises a random forest model and a logistic regression model.

One or more embodiments may include a method, comprising: receiving, via a communication interface, wireless signal data corresponding to a radio frequency identification (RFID) tag, wherein the wireless signal data comprises signal strength data and signal phase data, wherein the signal strength data and the signal phase data correspond to a plurality of wireless signals transmitted by the RFID tag and received by a radio frequency identification (RFID) reader; generating decomposed signal strength data based on a seasonal decomposition of the signal strength data, wherein the decomposed signal strength data comprises a seasonal data series, a trend data series, and a residual data series; generating a frequency-phase curve based on the signal phase data, wherein the frequency-phase curve indicates a plurality of signal phases detected across a plurality of transmission frequencies of the plurality of wireless signals; extracting a set of signal strength features based on the decomposed signal strength data; extracting a set of signal phase features based on the frequency-phase curve; and detecting a motion state of the RFID tag using a machine learning classifier, wherein the machine learning classifier is trained to detect the motion state of the RFID tag based at least on the set of signal strength features and the set of signal phase features.

In one example embodiment of a method, the method further comprises: detecting behavior associated with a physical asset based on the motion state of the RFID tag, wherein the RFID tag is associated with the physical asset.

In one example embodiment of a method: the set of signal strength features comprises one or more of: trend data extracted from the trend data series of the decomposed signal strength data; residual data extracted from the residual data series of the decomposed signal strength data; or a standard deviation of received signal strength indicators (RSSIs) extracted from the signal strength data; and the set of signal phase features comprises one or more of: a slope of a linear regression of the frequency-phase curve; a correlation coefficient of a least-squares regression of the frequency-phase curve; a descending trend corresponding to a phase variation of the plurality of signal phases; a dynamic range of the plurality of signal phases; or a number of zero crossings of the frequency-phase curve.

One or more embodiments may include a system, comprising: a radio frequency identification (RFID) reader to communicate with a plurality of radio frequency identification (RFID) tags; and processing circuitry to: receive, from the RFID reader, wireless signal data corresponding to a radio frequency identification (RFID) tag of the plurality of RFID tags, wherein the wireless signal data comprises signal strength data and signal phase data, wherein the signal strength data and the signal phase data correspond to a plurality of wireless signals transmitted by the RFID tag and received by the RFID reader; generate decomposed signal strength data based on a seasonal decomposition of the signal strength data, wherein the decomposed signal strength data comprises a seasonal data series, a trend data series, and a residual data series; generate a frequency-phase curve based on the signal phase data, wherein the frequency-phase curve indicates a plurality of signal phases detected across a plurality of transmission frequencies of the plurality of wireless signals; extract a set of signal strength features based on the decomposed signal strength data; extract a set of signal phase features based on the frequency-phase curve; and detect a motion state of the RFID tag using a machine learning classifier, wherein the machine learning classifier is trained to detect the motion state of the RFID tag based at least on the set of signal strength features and the set of signal phase features.

In one example embodiment of a system: the RFID tag corresponds to a physical asset; and the processing circuitry is further to detect behavior associated with the physical asset based on the motion state of the RFID tag.

In one example embodiment of a system: the set of signal strength features comprises one or more of: trend data extracted from the trend data series of the decomposed signal strength data; residual data extracted from the residual data series of the decomposed signal strength data; or a standard deviation of received signal strength indicators (RSSIs) extracted from the signal strength data; and the set of signal phase features comprises one or more of: a slope of a linear regression of the frequency-phase curve; a correlation coefficient of a least-squares regression of the frequency-phase curve; a descending trend corresponding to a phase variation of the plurality of signal phases; a dynamic range of the plurality of signal phases; or a number of zero crossings of the frequency-phase curve.

What is claimed is:

1. A device to perform motion detection for radio frequency identification (RFID) tags, comprising:
   interface circuitry; and
   processing circuitry to:
      receive, via the interface circuitry, wireless signal measurements associated with an RFID tag, wherein the wireless signal measurements comprise signal strength measurements and signal phase measurements obtained from wireless signals transmitted by the RFID tag over a time window;
      decompose the signal strength measurements into a plurality of decomposed signal strength time series datasets, wherein the decomposed signal strength time series datasets comprise a trend series and a residual series;
      extract frequency-phase data from the signal phase measurements, wherein the frequency-phase data indicates a plurality of signal phases detected across a plurality of transmission frequencies of the wireless signals transmitted by the RFID tag; and
      perform motion detection for the RFID tag, wherein the motion detection is to detect motion of the RFID tag based on the decomposed signal strength time series datasets and the frequency-phase data.

2. The device of claim 1, wherein the processing circuitry to decompose the signal strength measurements into the plurality of decomposed signal strength time series datasets is further to:
   perform a seasonal decomposition on the signal strength measurements, wherein the seasonal decomposition is to decompose the signal strength measurements into the decomposed signal strength time series datasets, wherein the decomposed signal strength time series datasets further comprise a seasonal series.

3. The device of claim 2, wherein the frequency-phase data represents a frequency-phase curve, wherein the frequency-phase curve indicates the plurality of signal phases detected across the plurality of transmission frequencies of the wireless signals transmitted by the RFID tag.

4. The device of claim 3, wherein the processing circuitry to perform motion detection for the RFID tag is further to:
   extract a set of signal strength features based on the decomposed signal strength time series datasets;
   extract a set of signal phase features based on the frequency-phase curve; and
   perform motion detection for the RFID tag using a machine learning classifier, wherein the machine learning classifier is trained to perform motion detection based on at least the set of signal strength features and the set of signal phase features.

5. The device of claim 4, wherein the processing circuitry to perform motion detection for the RFID tag using the machine learning classifier is further to:
   generate a motion state of the RFID tag, wherein the motion state indicates:
      an identity of the RFID tag;
      a time of occurrence of the motion state;
      whether the RFID tag is stationary or moving; and
      a movement energy intensity of the RFID tag.

6. The device of claim 4, wherein the set of signal strength features comprises:
   one or more trend features extracted from the trend series;
   one or more residual features extracted from the residual series; and
   a standard deviation of received signal strength indicators (RSSIs) extracted from the signal strength measurements.

7. The device of claim 4, wherein the set of signal phase features comprises one or more of:
   a slope of a linear regression of the frequency-phase curve;
   a correlation coefficient of a least-squares regression of the frequency-phase curve;
   a descending trend corresponding to a phase variation of the plurality of signal phases;
   a dynamic range of the plurality of signal phases; or
   a number of zero crossings of the frequency-phase curve.

8. The device of claim 1, wherein the processing circuitry is further to:
   detect, based on the motion of the RFID tag, behavior associated with a physical asset corresponding to the RFID tag.

9. At least one non-transitory machine accessible storage medium having instructions stored thereon, wherein the instructions, when executed on processing circuitry, cause the processing circuitry to:
   receive wireless signal measurements associated with a radio frequency identification (RFID) tag, wherein the wireless signal measurements comprise signal strength measurements and signal phase measurements obtained from wireless signals transmitted by the RFID tag over a time window;
   decompose the signal strength measurements into a plurality of decomposed signal strength time series datasets, wherein the decomposed signal strength time series datasets comprise a trend series and a residual series;
   extract frequency-phase data from the signal phase measurements, wherein the frequency-phase data indicates a plurality of signal phases detected across a plurality of transmission frequencies of the wireless signals transmitted by the RFID tag; and
   perform motion detection for the RFID tag, wherein the motion detection is to detect motion of the RFID tag based on the decomposed signal strength time series datasets and the frequency-phase data.

10. The storage medium of claim 9, wherein the decomposed signal strength time series datasets further comprise:

one or more periodic data series; and
one or more non-periodic data series.

11. The storage medium of claim 9, wherein:
the decomposed signal strength time series datasets further comprise a seasonal series; and
the frequency-phase data represents a frequency-phase curve, wherein the frequency-phase curve indicates the plurality of signal phases detected across the plurality of transmission frequencies of the wireless signals transmitted by the RFID tag.

12. The storage medium of claim 11, wherein the instructions that cause the processing circuitry to perform motion detection for the RFID tag further cause the processing circuitry to:
extract a set of signal strength features based on the decomposed signal strength time series datasets;
extract a set of signal phase features based on the frequency-phase curve; and
perform motion detection for the RFID tag using a machine learning classifier, wherein the machine learning classifier is trained to perform motion detection based on at least the set of signal strength features and the set of signal phase features.

13. The storage medium of claim 12, wherein the instructions that cause the processing circuitry to perform motion detection for the RFID tag using the machine learning classifier further cause the processing circuitry to:
generate a motion state of the RFID tag, wherein the motion state indicates:
an identity of the RFID tag;
a time of occurrence of the motion state;
whether the RFID tag is stationary or moving; and
a movement energy intensity of the RFID tag.

14. The storage medium of claim 12, wherein the set of signal strength features comprises:
one or more trend features extracted from the trend series;
one or more residual features extracted from the residual series; and
a standard deviation of received signal strength indicators (RSSIs) extracted from the signal strength measurements.

15. The storage medium of claim 12, wherein the set of signal phase features comprises one or more of:
a slope of a linear regression of the frequency-phase curve;
a correlation coefficient of a least-squares regression of the frequency-phase curve;
a descending trend corresponding to a phase variation of the plurality of signal phases;
a dynamic range of the plurality of signal phases; or
a number of zero crossings of the frequency-phase curve.

16. The storage medium of claim 12, wherein the machine learning classifier comprises a voting classifier, wherein the voting classifier is to perform motion detection for the RFID tag based on motion detection predictions from a plurality of machine learning models.

17. The storage medium of claim 12, wherein the machine learning classifier comprises a single model classifier, wherein the single model classifier comprises:
a support-vector machine (SVM) model;
a random forest model; or
a logistic regression model.

18. The storage medium of claim 9, wherein the instructions further cause the processing circuitry to:
detect, based on the motion of the RFID tag, behavior associated with a physical asset corresponding to the RFID tag.

19. The storage medium of claim 18, wherein:
the physical asset comprises a retail product; and
the behavior associated with the physical asset comprises a human interaction with the retail product.

20. A method of performing motion detection for radio frequency identification (RFID) tags, comprising:
receiving wireless signal measurements associated with an RFID tag, wherein the wireless signal measurements comprise signal strength measurements and signal phase measurements obtained from wireless signals transmitted by the RFID tag over a time window;
decomposing the signal strength measurements into a plurality of decomposed signal strength time series datasets, wherein the decomposed signal strength time series datasets comprise a trend series and a residual series;
extracting frequency-phase data from the signal phase measurements, wherein the frequency-phase data indicates a plurality of signal phases detected across a plurality of transmission frequencies of the wireless signals transmitted by the RFID tag; and
performing motion detection for the RFID tag, wherein the motion detection is to detect motion of the RFID tag based on the decomposed signal strength time series datasets and the frequency-phase data.

21. The method of claim 20, wherein performing motion detection for the RFID tag comprises:
extracting a set of signal strength features based on the decomposed signal strength time series datasets;
extracting a set of signal phase features based on the frequency-phase data; and
performing motion detection for the RFID tag using a machine learning classifier, wherein the machine learning classifier is trained to perform motion detection based on at least the set of signal strength features and the set of signal phase features.

22. The method of claim 20, further comprising:
detecting, based on the motion of the RFID tag, behavior associated with a physical asset corresponding to the RFID tag.

23. The method of claim 22, wherein:
the physical asset comprises a retail product; and
the behavior associated with the physical asset comprises a human interaction with the retail product.

24. A system, comprising:
a radio frequency identification (RFID) reader to communicate with a plurality of RFID tags; and
processing circuitry to:
receive, from the RFID reader, wireless signal measurements associated with an RFID tag of the plurality of RFID tags, wherein the wireless signal measurements comprise signal strength measurements and signal phase measurements obtained from wireless signals transmitted by the RFID tag over a time window;
decompose the signal strength measurements into a plurality of decomposed signal strength time series datasets, wherein the decomposed signal strength time series datasets comprise a trend series and a residual series;
extract frequency-phase data from the signal phase measurements, wherein the frequency-phase data indicates a plurality of signal phases detected across a plurality of transmission frequencies of the wireless signals transmitted by the RFID tag; and
perform motion detection for the RFID tag, wherein the motion detection is to detect motion of the RFID tag based on the decomposed signal strength time series datasets and the frequency-phase data.

25. The system of claim 24, wherein:

the RFID tag corresponds to a physical asset; and the processing circuitry is further to detect behavior associated with the physical asset based on the motion of the RFID tag.

\* \* \* \* \*